(12) United States Patent
Gupta et al.

(10) Patent No.: US 9,171,284 B2
(45) Date of Patent: Oct. 27, 2015

(54) TECHNIQUES TO RESTORE COMMUNICATIONS SESSIONS FOR APPLICATIONS HAVING CONVERSATION AND MEETING ENVIRONMENTS

(75) Inventors: Amit Gupta, Redmond, WA (US); Kevin Morrison, Arlington, MA (US); Michael Eckert, Seattle, WA (US); Thomas Bouchard, Seattle, WA (US); Marcelo Truffat, Woodinville, WA (US); Blaine Carpenter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 13/032,019

(22) Filed: Feb. 22, 2011

(65) Prior Publication Data
US 2011/0185288 A1 Jul. 28, 2011

Related U.S. Application Data

(63) Continuation-in-part of application No. 12/395,729, filed on Mar. 2, 2009.

(51) Int. Cl.
*G06F 15/16* (2006.01)
*G06Q 10/10* (2012.01)
(Continued)

(52) U.S. Cl.
CPC .............. *G06Q 10/10* (2013.01); *H04L 12/581* (2013.01); *H04L 65/4007* (2013.01)

(58) Field of Classification Search
CPC ............ H04L 65/4007; H04L 12/1813; H04L 12/581; H04L 12/1822; H04L 12/2496; H04L 12/589; H04L 41/026

USPC .......................................................... 709/206
See application file for complete search history.

(56) References Cited

U.S. PATENT DOCUMENTS 5,208,748 A     5/1993   Flores et al.
6,163,692 A *  12/2000   Chakrabarti et al. ......... 455/416
(Continued)

FOREIGN PATENT DOCUMENTS

JP   H08297637      11/1996
JP   2003-298750    10/2003
(Continued)

OTHER PUBLICATIONS

"Google Talk", Retrieved at <<http://www.google.com/talk/chathistory.html, Retrieved Date: Jan. 27, 2011, pp. 3.
(Continued)

*Primary Examiner* — Jude Jean Gilles
*Assistant Examiner* — Jaren M Means
(74) *Attorney, Agent, or Firm* — Andrew Smith; Leonard Smith; Micky Minhas

(57) ABSTRACT

Techniques for restoring communications sessions for applications having conversation environment and a meeting embodiment are described. A system may include a meeting component of a communications application for selecting a meeting from multiple meetings, a conversation component of the communications application for managing multiple conversation threads, and a recovery component of the communications application for recovering an active meeting from the multiple meetings or an active conversation thread from the multiple conversation threads. Other embodiments are described and claimed.

20 Claims, 25 Drawing Sheets

(51) Int. Cl.
*H04L 29/06* (2006.01)
*H04L 12/58* (2006.01)

(56) References Cited

U.S. PATENT DOCUMENTS

| | | | |
|---|---|---|---|
| 7,024,209 | B1 | 4/2006 | Gress et al. |
| 7,051,049 | B2 | 5/2006 | Samn |
| 7,509,388 | B2 | 3/2009 | Allen et al. |
| 7,640,293 | B2 | 12/2009 | Wilson et al. |
| 2002/0019797 | A1 | 2/2002 | Stewart et al. |
| 2003/0163537 | A1 | 8/2003 | Rohall et al. |
| 2003/0167339 | A1* | 9/2003 | Zhu et al. ............. 709/238 |
| 2003/0220973 | A1* | 11/2003 | Zhu et al. ............. 709/205 |
| 2004/0203664 | A1 | 10/2004 | Lei et al. |
| 2005/0198123 | A1 | 9/2005 | Nagayama et al. |
| 2005/0267975 | A1 | 12/2005 | Qureshi et al. |
| 2007/0033250 | A1 | 2/2007 | Levin et al. |
| 2007/0242656 | A1 | 10/2007 | Klassen et al. |
| 2007/0250580 | A1 | 10/2007 | Caspi et al. |
| 2007/0299912 | A1 | 12/2007 | Sharma et al. |
| 2008/0059587 | A1 | 3/2008 | Burtner et al. |
| 2008/0189366 | A1 | 8/2008 | Cox et al. |
| 2010/0011080 | A1 | 1/2010 | Kordun |
| 2011/0016516 | A1 | 1/2011 | Mo |

FOREIGN PATENT DOCUMENTS

| | | |
|---|---|---|
| JP | 2007-027918 | 2/2007 |
| JP | 2008-092157 | 4/2008 |
| KR | 1020030017043 A | 3/2003 |
| KR | 1020050041768 A | 5/2005 |
| WO | 2009005914 | 1/2009 |

OTHER PUBLICATIONS

"Find Previous IM Conversations", Retrieved at <<http://office.microsoft.com/en-us/communicator-help/find-previous-im-conversations-HA010206473.aspx>>, Retrieved Date: Jan. 27, 2011, pp. 1.

"CDW Advanced Applications Solutions", Retrieved at <<http://www.cdw.com/content/solutions/unified-communications/advanced-applications.aspx>>, Retrieved Date: Dec. 5, 2008, pp. 2.

"Alcatel-Lucent OmniTouch Unified Communication", Retrieved at <<http://www1.alcatel-lucent.com/products/productsummary.jsp?productNumber=tcm:228-225551635>>, Retrieved Date: Dec. 5, 2008, pp. 3.

"IBM Launches Family of Unified Communications and Collaboration Software", Retrieved at <<http://www-03.ibm.com/industries/telecom/us/detail/news/Y981324V93500U14.html>>, Aug. 22, 2007, pp. 2.

Gates, Bill, "The Unified Communications Revolution", Retrieved at <<http://www.microsoft.com/mscorp/execmail/2006/06-26unifiedcomm.mspx>>, Jun. 26, 2006, pp. 4.

"UCS (Unified Communication Solution)", Retrieved at <<http://www.lg-nortel.net/application.html>>, Retrieved Date: Dec. 5, 2008, pp. 1.

Blowers, Mark, "Unified Communications", Retrieved at <<http://www.avaya.com.au/uc/butlerGroup/files/Butler%20Group%20_%20Avaya%20Unified%20Communications%209_08.pdf>>, Sep. 2008, pp. 1-8.

Ramanathan, Rajesh, "Office Communications Server How Presence Powers OCS 2007", Retrieved at http://technet.microsoft.com/en-us/magazine/cc194409.aspx>>, May 2008, pp. 5.

"International Search Report", Mailed Date: Sep. 28, 2010, Application No. PCT/US2010/025673, Filed Date: Feb. 26, 2010, (MS# 325559.02).

Office Action received for Chinese Patent Application No. 201080010620.3, mailed Apr. 28, 2013, 13 pages including 3 pages English translation.

Office Action received for Japanese Patent Application No. 2011-552996, mailed Apr. 1, 2014, 6 pages.

* cited by examiner

TECHNIQUES TO RESTORE COMMUNICATIONS SESSIONS FOR APPLICATIONS HAVING CONVERSATION AND MEETING ENVIRONMENTS

RELATED CASE

This application is a Continuation-In-Part of commonly owned U.S. patent application Ser. No. 12/395,729 titled "Communications Application Having Conversation and Meeting Environments" filed on Mar. 2, 2009, which is hereby incorporated by reference in its entirety.

BACKGROUND

Communications applications are available for enabling users to have conversations in which synchronous, real-time communication is occurring between parties. For example, conversations have traditionally been held over telephones, though telephone conversation capability has been extended through conference calling, video conferencing, and multiple party conversations via voice over IP (VoIP).

In addition to telephone, conversations have come to include text-based forms of real-time communication such as instant messaging and group chat. In these approaches, two or more users exchange text messages that are transmitted and read by all users. The users participate in an exchange of messages that occurs synchronously for all users. In this way, synchronous text-based conversations can differ from communications such as email in which the parties are not in synchronous, real-time communication, but exchange messages over extended periods of time.

Network-based meetings are also performed online in which one party shares a computer desktop or application with one or more other parties over a network connection. In this way, all meeting participants are able to view a common presentation and interact to exchange ideas. A meeting can be any type of collaboration session, including those in which each participant can speak to the other participants or exchange text messages, for example.

Typically, different applications can be used for conversations and meetings. Oftentimes, a different application is used for each different type of conversation, for example, an instant messaging application for texting and a separate VoIP application for voice conversations over IP networks. Additionally, instant messaging, chat threads, and recorded VoIP conversations can be saved for future reference. However, it can be difficult, for example, for a user to organize the various conversation applications and locate saved conversations in addition to managing a separate meeting application. Furthermore, it can be difficult, for example, for a user to restore lost communications and associated context for different types of conversations and meetings. It is with respect to these and other considerations that improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for bringing a conversation environment and a meeting environment into a single communications application. In this way, a user experience is provided that enables communication and collaboration around applications and related topics, projects and documents rather than verbal or text-based communication.

The communications application includes a meeting component for providing a meeting environment to the user. The meeting component enables the user to select a particular meeting from multiple meetings. A meeting schedule component tracks scheduled online meetings defined according to a list. An ad hoc collaboration component enables the user to create an ad hoc meeting. In this way, users can initiate, interact and manage meetings seamlessly inside a single communications application. The meetings environment also enables the user to manage content related to one or more of the meetings, such as applications, documents and other pre-meeting or post-meeting content.

The communications application also includes a conversation component for providing a conversation environment to the user. The conversation component enables the user to manage multiple conversation threads. The multiple conversation threads can be in any suitable format, such as instant messaging, group chat, telephone calls, or an online meeting. The conversation threads can include active conversation threads, past conversation threads, and persistent conversation threads, for example. The communications application also enables the user to perform searches of the meetings and conversations.

The communications application further includes a recovery component for restoring a communications session for an active communications item in response to a recovery event. An active communications item may comprise, for example, a communications session for an active meeting or an active conversation thread. A recovery event may comprise, for example, an interruption of a communications session for an active communications item. A store component stores recovery information for an active communications item, and a monitor component monitors various aspects of a communications session for the active communications item to detect a recovery event. When a recovery event is detected, a recovery component attempts to automatically recover the communications session and associated context using the recovery information, with the recovered communications session having identical or similar session information and content used before the recovery event.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
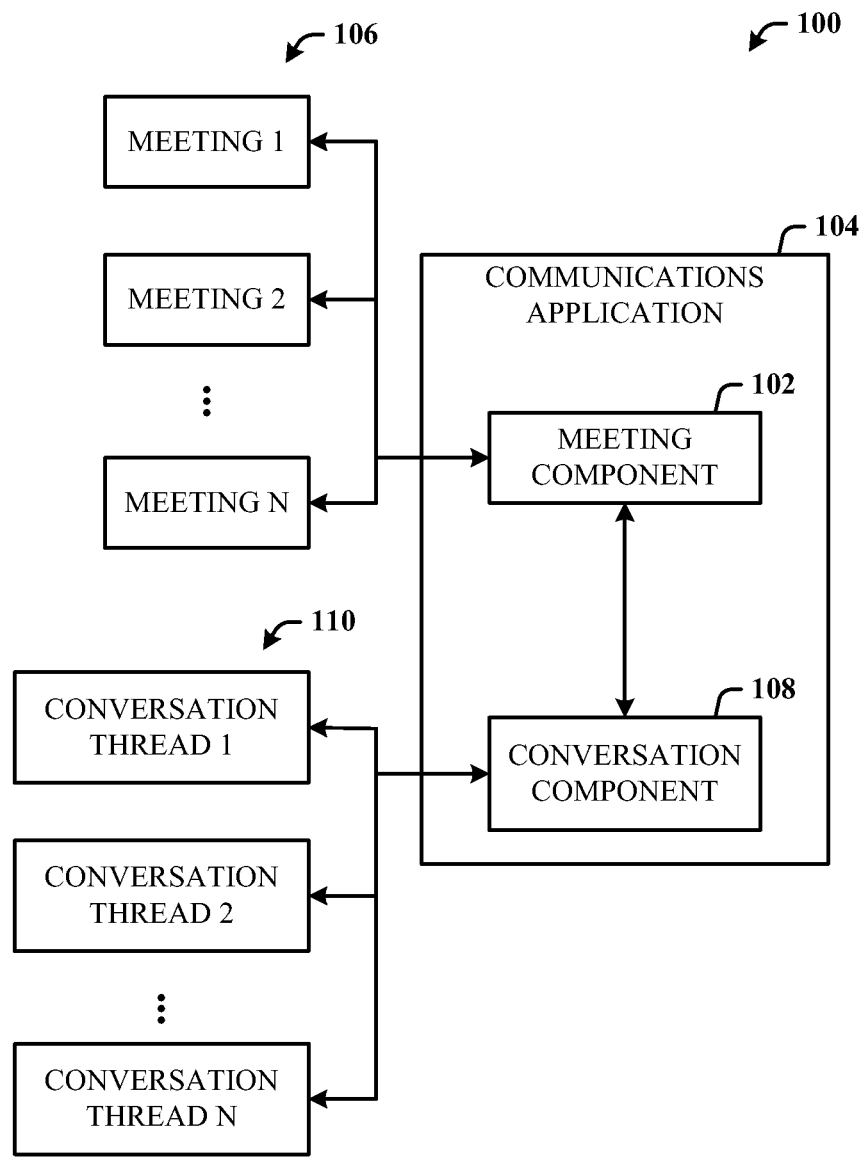
FIG. 1 illustrates a computer-implemented system for performing communications.

The disclosed communications architecture provides a user experience that includes a conversation environment and a meeting embodiment in a single real-time communications application. Real-time communications applications are people-centric, and all communications are only centered on people. As VoIP solutions evolved, a phone environment has been added; however, the introduction of conversations and meeting into the real-time application provides a rich user experience for addressing modalities heretofore not available in a single real-time communications application.

A navigation menu enables the user to select between multiple communications environments, including a conversations environment and a meeting environment, among other selections. Multiple conversation threads can be accessed in various conversation formats, including formats associated with instant messaging, group chat, a telephone call, voice, video, email, application sharing, and an online meeting, for example. A meeting environment can be navigated for accessing one or more meetings. Other suitable communications environments can be also navigated from the same navigation menu, besides the conversation environment and meeting environment.

The disclosed architecture brings the management of different types of conversations (e.g., text-based, audio-based, etc.) into a single communications application, thus allowing a user to navigate and move seamlessly between conversations. Real-time messaging applications are "people-centric" since the various modalities of communication are centered on people and associated human interactions. A "meeting" is a specialized type of interaction where users are collaborating with multiple modalities (e.g., voice, text, video, documents, desktop sharing, etc.). A conversation on the telephone or with text can be escalated to a meeting experience. Conversely, a meeting can lead to a follow-up conversation on a phone or conference call. Rather than using multiple separate applications for these interactions, incorporating both a conversation environment and a meeting environment into a single communication application allows the user to navigate through ad hoc and scheduled communications, follow-up on past and missed conversations and escalate these communications into an immersive real-time meeting experience.

The communications system and application also includes a selection pane for displaying a list of the conversation threads or meetings, depending on the environment selected by the user. The selection pane can include a list of active conversation threads or meetings, as well as lists of history conversation threads or meetings and persistent conversation threads or meetings. A preview pane can also be included in the communications system. The preview pane displays a preview of a specific item from the list shown in the selection pane.

The communications system and application further includes a recovery architecture for recovering or restoring a communications session for an active communications item in response to a recovery event. Many times, a communications session for a meeting or conversation thread may be unexpectedly disrupted due to internal or external problems, or sometimes even human error. For instance, a client device may incur a communications error such as loss of radio channels or network disconnect, a computing error such as application failure and restart, a platform error such as loss of power, or an accidental activation of an end button by the user, among many others. When a recovery event occurs, a user typically needs to manually restart a communications session and may not have the necessary information readily available, such as a conference number and access code, for example. Further, a recovery event causes a loss of context for the communications session, including any previous information conveyed during the communications session, which may include previous texts, voice, audio, video, documents, notes, and so forth. The recovery architecture attempts to solve these and other problems by monitoring for a recovery event and automatically recovering a lost communications session, including any context for the communications session such as historical information used prior to the recovery event. In this manner, a user may experience a seamless and smooth recovery of communications and context for a meeting or conversation thread, among other types of activities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

It is worthy to note that descriptions of some embodiments may use one or more reference variables, such as a reference variable N, for example. Each reference variable may represent any positive integer. Further, use of identical reference variables (e.g., N) in varying descriptions do not necessarily indicate that a same value needs to be assigned to each instance of an identical reference variable.

Communications Architecture

FIG. 1 illustrates a computer-implemented system 100 for performing communications. The system 100 provides a single user experience for accessing multiple communications environments to facilitate communications and collaboration between users (e.g., groups). The communications environments can include a meeting environment and a conversation environment. The meeting environment is established through a meeting component 102, which is part of a communications application 104. The meeting component 102 enables the user to select a meeting from multiple meetings 106. The conversation environment is established through a conversation component 108, which is also part of the communications application 104. The conversation component enables the user to manage multiple conversation threads 110.

Through the meeting component 102, the meeting environment provides easy access to online meetings and related content. The meeting component 102 enables online meetings to be created in the communications application 104 that are available in the meeting environment. The meeting component 102 provides access to meeting-related content stored on external applications, such as a remote server. The meeting component 102 also provides one-click access to join available meetings displayed within the communications application 104, as discussed in detail hereinbelow. Additionally, a user can search all meetings to which access is available. In these ways, the meeting component 102 enables a range of online conferencing capabilities to become integral parts of meetings and provides users with a single application to join and participate in meetings.

The conversation component 108 provides conversation management for users participating in multiple online conversations. This helps users organize conversation threads 110 according to individual users or topics. A user can also browse or search other ongoing conversation threads 110 related to a given topic or project, as will be set forth in greater detail hereinbelow. It is to be appreciated that conversation threads 110 can be associated with different conversation types, including but not limited to, instant messaging, group chat, telephone calls, video, and/or an online meeting.

Figure 2:
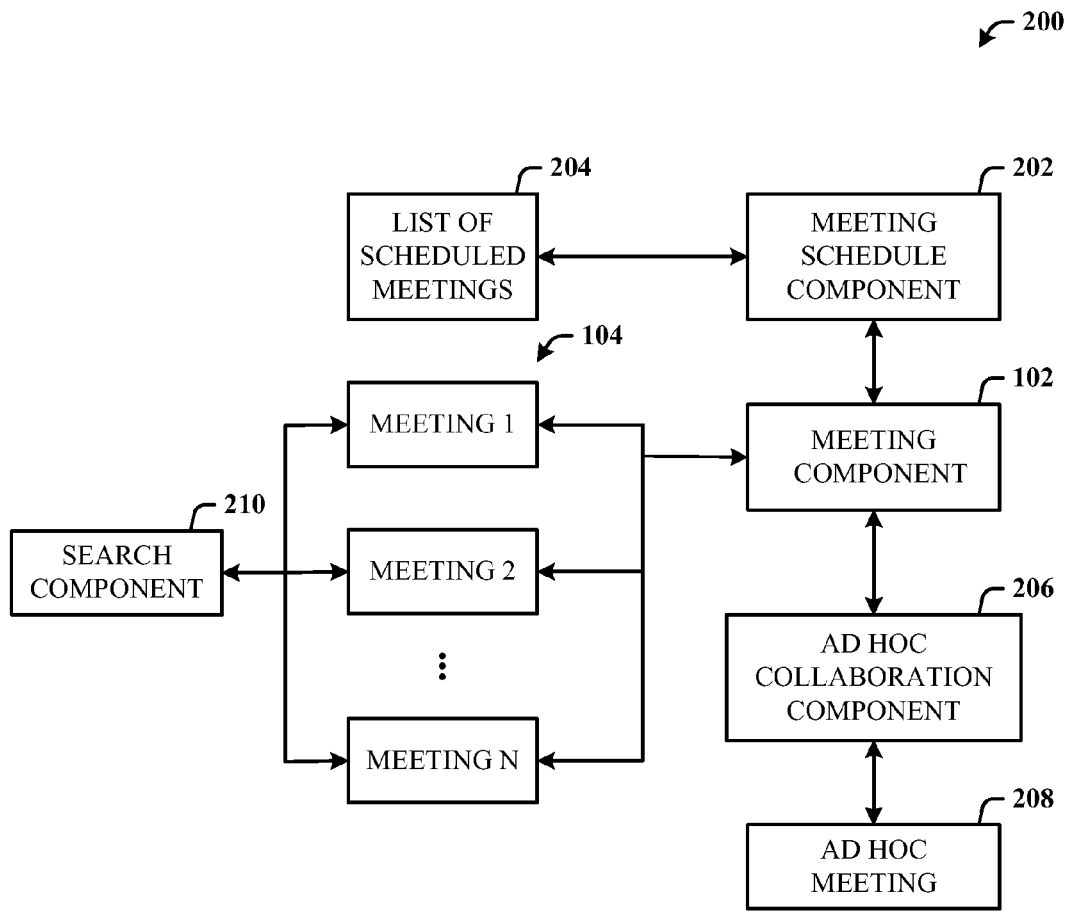
FIG. 2 illustrates aspects of the meeting component as used with the computer-implemented system for performing communications.

FIG. 2 illustrates aspects of the meeting component 102 as used with the computer-implemented system 100 for performing communications. A meeting schedule component 202 enables the tracking of scheduled online meetings defined according to a list 204 of scheduled meetings. The meetings shown on the list 204 can include active and/or tagged meetings. The meeting schedule component 202 allows the user to obtain quick access to online meetings that are currently active or tagged by the user. The list 204 can also include scheduled upcoming meetings. The list 204 can be saved on a user's local application or accessed from a remote network server.

FIG. 2 also illustrates an ad hoc collaboration component 206 that can be used for creating an ad hoc meeting 208. This allows a selected group of users to create meetings "on the spot" with a single click in the user interface of the communication application 104 (of FIG. 1), rather than creating a scheduled meeting in advance. In this way, the user can open and access a virtual meeting conference room to start an ad hoc collaboration at any time.

As also illustrated in FIG. 2, a search component 210 can be used for performing searches of the multiple meetings. This enables the user to locate meetings or content that can be related to a specific, project, or site, located on a network server or other remote storage location. In one aspect, metadata can be incorporated into meetings as part of an existing meeting file or as a separate, associated index file. Thus, the search component 210 enables a search of meetings to be performed.

Figure 3:
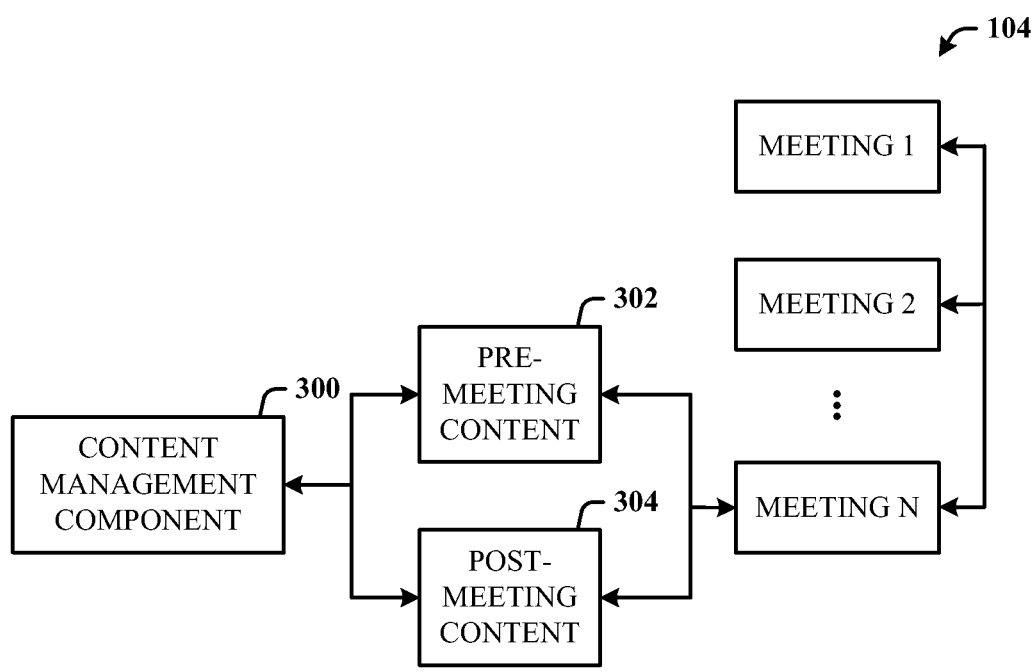
FIG. 3 illustrates a content management component for managing content related to meetings.

FIG. 3 illustrates a content management component 300 for managing content related to meetings. The content management component 300 can manage pre-meeting content 302 and post-meeting content 304 related to at least one of the multiple meetings 106. This pre-meeting content 302 and post-meeting content 304 can be shared with other users participating in a particular meeting. The pre-meeting content 302 can include background information related to the meeting, so that the users can review content files prior to the meeting as part of meeting preparation. The post-meeting content 304 can be reviewed after the meeting so that the users can implement or take action on subjects discussed in the meeting. In this way, quick sharing of meeting content with all participants can be facilitated, providing a useful meeting environment through the communication application 104.

Figure 4:
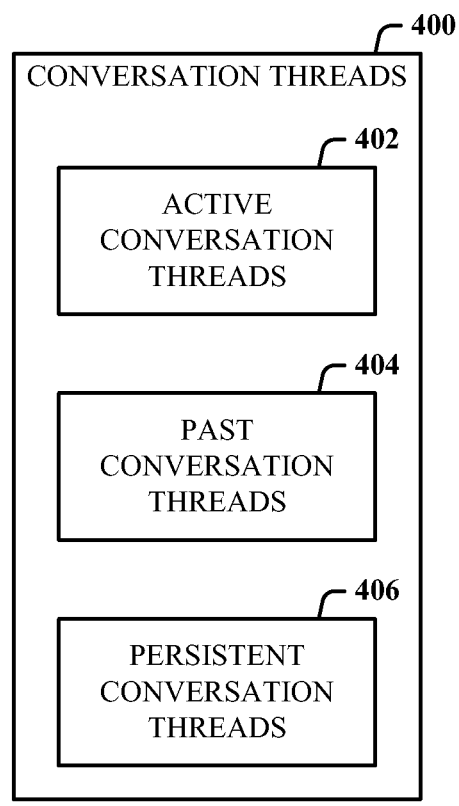
FIG. 4 illustrates additional aspects of conversation threads managed by a conversation component.

FIG. 4 illustrates additional aspects of conversation threads 400 managed by the conversation component 108. The conversation threads 400 include active conversation threads 402. The conversation component 108 can manage active conversations by enabling the user to quickly shift between active conversations with one or more persons in multiple different modalities. For example, the user can access an active instant messaging thread, while concurrently engaged with a phone conversation, a video conference, and/or an application sharing session.

The conversation threads 400 can also include past conversation threads 404. The conversation component 108 enables the user to view a conversation history of recent or old conversation threads 404 and quickly restart a conversation.

The conversation threads 400 can also include persistent conversation threads 406. The conversation component 108 enables the user to view, create, and manage topic or group-centric conversations that persist over a period of time between multiple users. It is to be appreciated that the conversation threads 400 can include other types of conversations in addition to those indicated hereinabove, and that the conversation threads 400 depicted are not to be construed as limiting in any way.

Figure 5:
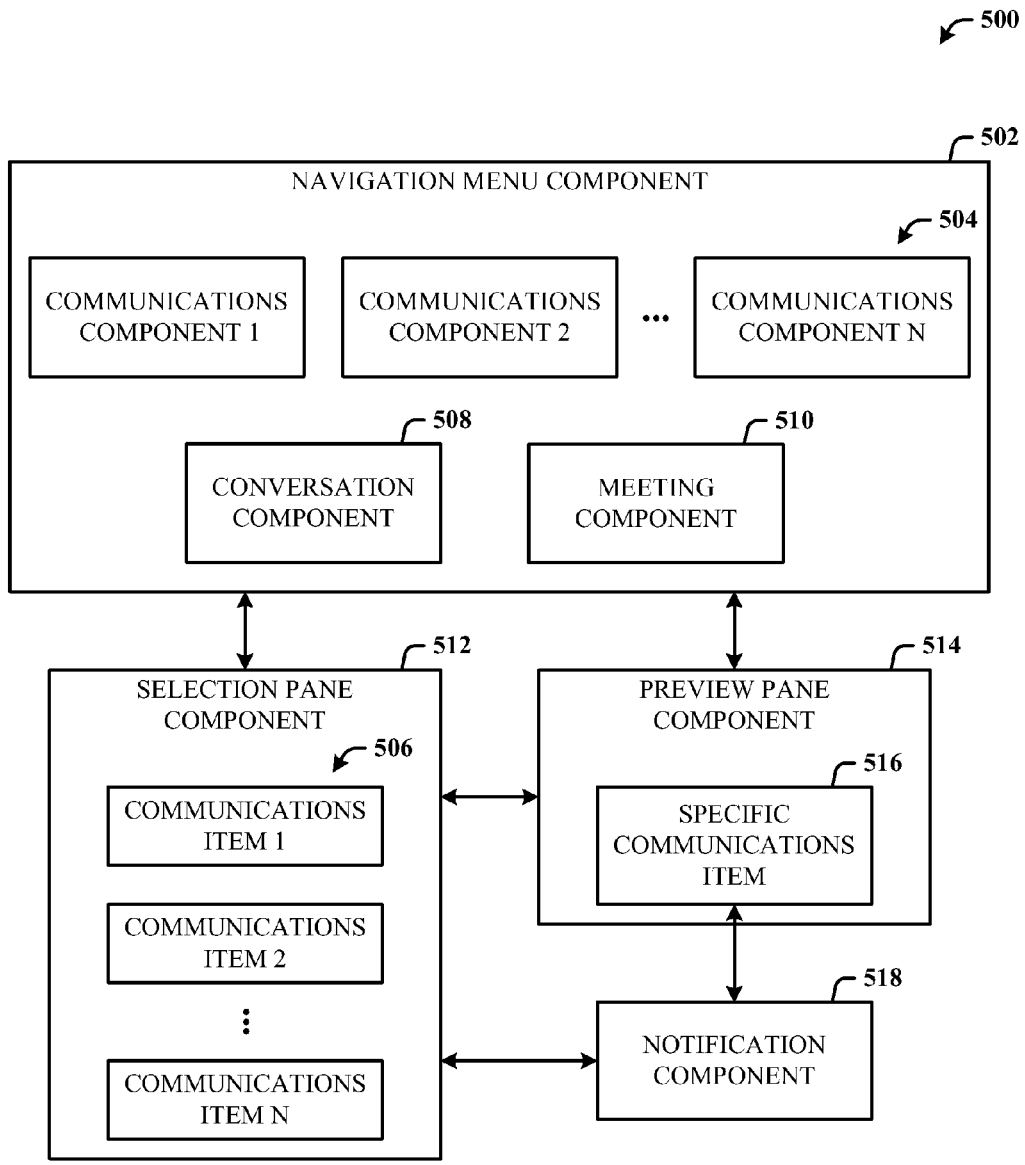
FIG. 5 illustrates an alternative embodiment of the computer-implemented system for performing communications.

FIG. 5 illustrates an alternative embodiment of a computer-implemented system 500 for performing communications. A navigation menu component 502 enables the user to select between multiple communications components 504 that include communications items 506, as set forth hereinbelow. The communications components 504 include a conversation component 508 (similar to conversation component 108 of FIG. 1) and a meeting component 510 (similar to meeting component 102 of FIG. 1), which are components that provide representations of a conversation environment and a meeting environment in a single communications application, rather than separate application environments, as typical with previous-type systems.

As illustrated in FIG. 5, the conversation component 508 provides the user with a conversation environment in which the communications items 506 include one or more conversation threads presented in one or more a conversation formats. The conversation format can include any suitable format, such as those associated with instant messaging, group chat, a telephone call, voice or audio, video, email, application sharing, and/or meeting formats.

As also illustrated in FIG. 5, the meeting component 510 provides the user with a meeting environment in which the communications items 506 include one or more meetings. As mentioned in connection with the aforementioned embodiment, the meeting component 510 can include aspects of managing meeting history, upcoming meetings, and managing meeting content within the real-time communications environment.

As also illustrated in FIG. 5, the navigation menu component 502 includes selection options for different communications component types selected from the communication components 504, in addition to the conversation component 508 and the meeting component 510. These different communications component types can include components for "people & groups" and "phone" environments, for example. Combining multiple different communication environments together in a single communication application brings a new dimension to how users manage a communications experience.

FIG. 5 also illustrates a selection pane component 512 for displaying a list of the communications items 506. The selection pane component 512 can be a section of a user interface in the communications application that enables the user to quickly scan the communications and select an item, for example, by clicking a specific item to open or resume a communications session (e.g., a conversation thread or meeting). A preview pane component 514 displays a preview of a specific communications item 516 from the list of communications items 506. In this way, the user can view the content of the specific communications item before deciding whether or not to open or resume.

FIG. 5 also illustrates a notification component 518 for indicating a new active communication item or a missed communication item. The notification component 518 particularly denotes activity in the conversation environment. For example, if the user is engaged in five active or open conversations, and if one of the conversations has an unread message, the conversation environment will notify the user of this unread message using the notification component 518. The notification component 518 can be a flag or icon or other visually discernable element, on the interface for example, that draws attention to that specific conversation. The notification component 518 can notify the user of new activity in active conversations and can also notify the user of missed conversations. The notification component 518 can also include an audible indicator to audibly alert the user.

Figure 6:
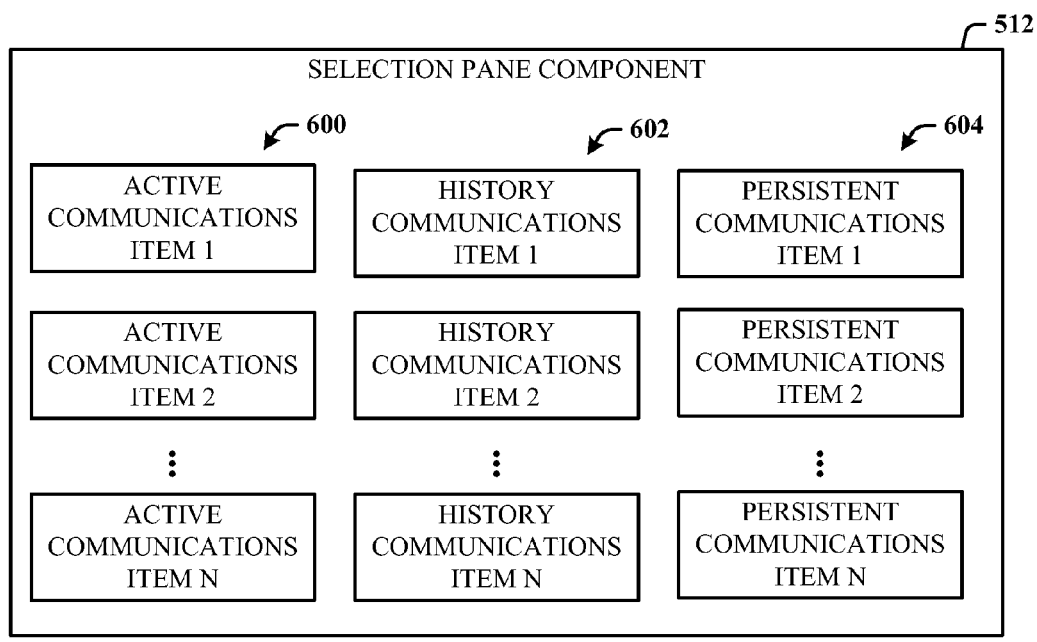
FIG. 6 illustrates additional aspects of types of conversations items displayed in a selection pane.

FIG. 6 illustrates additional aspects of the types of conversations items displayed in the selection pane component 512. The selection pane component 512 includes a list of active communications items 600. This can include active conversation threads or meetings. The selection pane component 512 can also include a list of history communications items 602, which can include past conversation threads and meetings. A list of persistent communications items 604 can also be presented in the selection pane component 512, which include ongoing communications between multiple user participants.

As described hereinabove the communication system 500 can define a conversation environment and a meeting environment in a single communications application. However, the communication system 500 and the associated application can also include a "people & groups" environment and "phone" environment. In such an implementation, the navigation menu component 502 can provide a conversation environment that enables users to manage active, past and persistent conversations, along with a meeting environment that enables users to manage communications around scheduled and ad hoc collaborations among users and topics.

As disclosed herein, the subject embodiments provide a single unified user experience that provides meetings and conversations and other types of conversations to be managed as objects for initiating communication and collaboration, regardless of the storage or data source. In this way, the subject embodiments provide advantages over previous systems that employ unrelated applications that store various communications in different, unassociated locations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
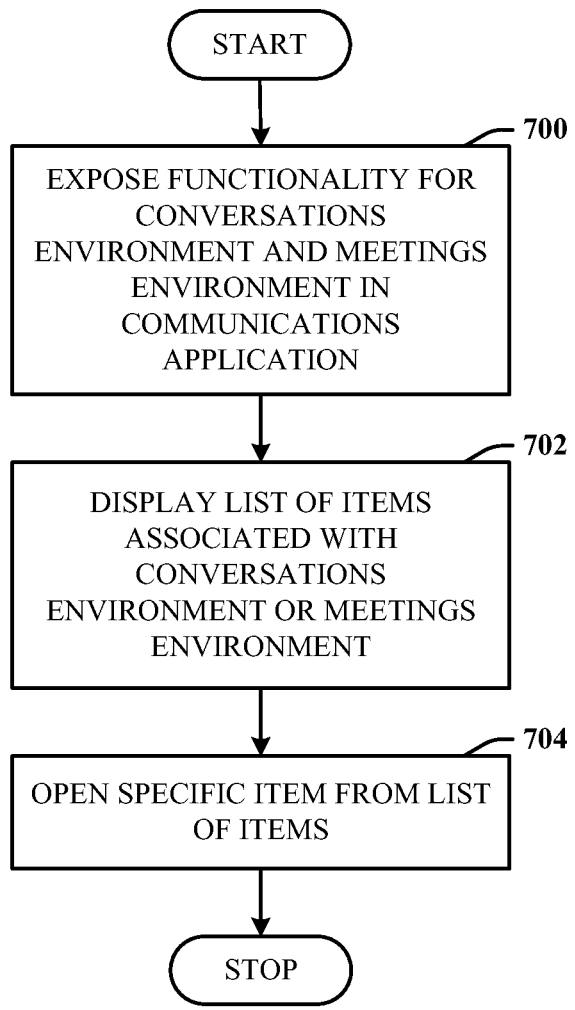
FIG. 7 illustrates a method of communications.

FIG. 7 illustrates a method of communications employing multiple communication environments. At 700, functionality for a conversations environment and a meetings environment is exposed in a communications application. At 702, a list of items associated with the conversations environment or the meetings environment is displayed. At 704, a specific item is opened from the list of items. In this way, a user is able to select between the conversations environment and the meetings environment (as well as other environments), and interact thereby to perform multiple communications operations.

Figure 8:
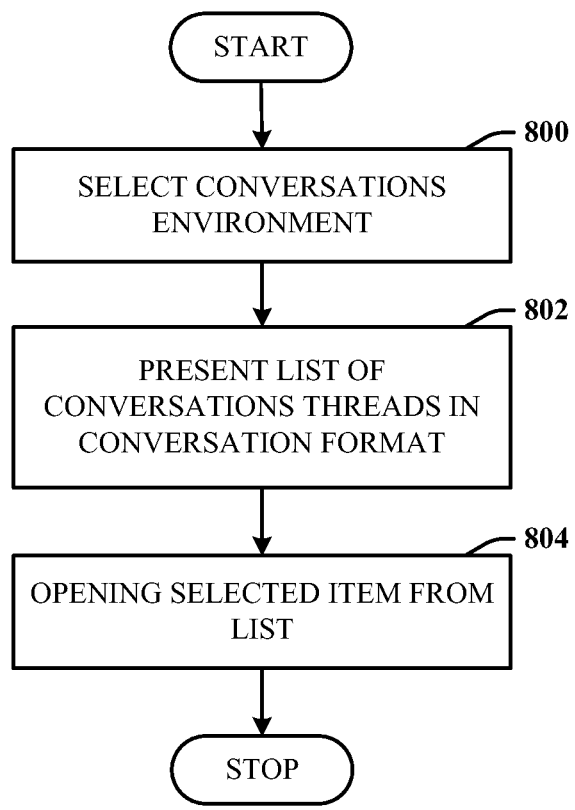
FIG. 8 illustrates further aspects in the method of communications.

FIG. 8 illustrates further aspects in the method of communications. At 800, the conversations environment is selected. At 802, a list of communications threads in a conversation format is presented to the user in response to selection of the conversations environment by the user, who can select from the list. This list of communications threads corresponds to the list of items at 702 (of FIG. 7), as relating to the conversations environment. At 804, a selected item from the list of communications threads is opened, which corresponds to the opening of the specific item at 704 (of FIG. 7), as pertaining to the communications environment. Once the selected conversation thread is opened, the user can review or continue the conversation.

Figure 9:
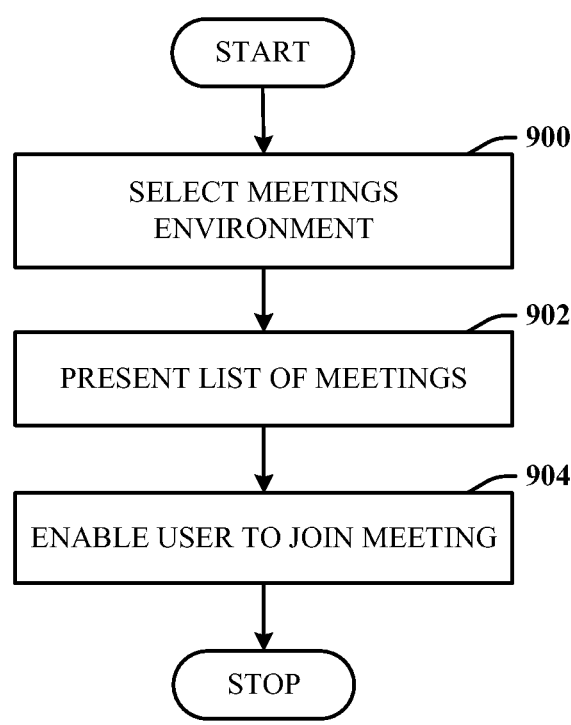
FIG. 9 illustrates additional aspects in the method of communications.

FIG. 9 illustrates additional aspects in a method of communications. At 900, the meetings environment is selected. At 902, a list of meetings is presented to the user in response to selection of the meetings environment by the user, in order to select a meeting from the list. This list of meetings corresponds to the list of items at 702 (of FIG. 7), as relating to the conversations environment. At 904, the user is enabled to join a selected meeting, and this corresponds to the opening of the specific item at 704 (of FIG. 7), as pertaining to the meetings environment. Once the selected meeting is joined, the user can participate in the meeting.

Figure 10:
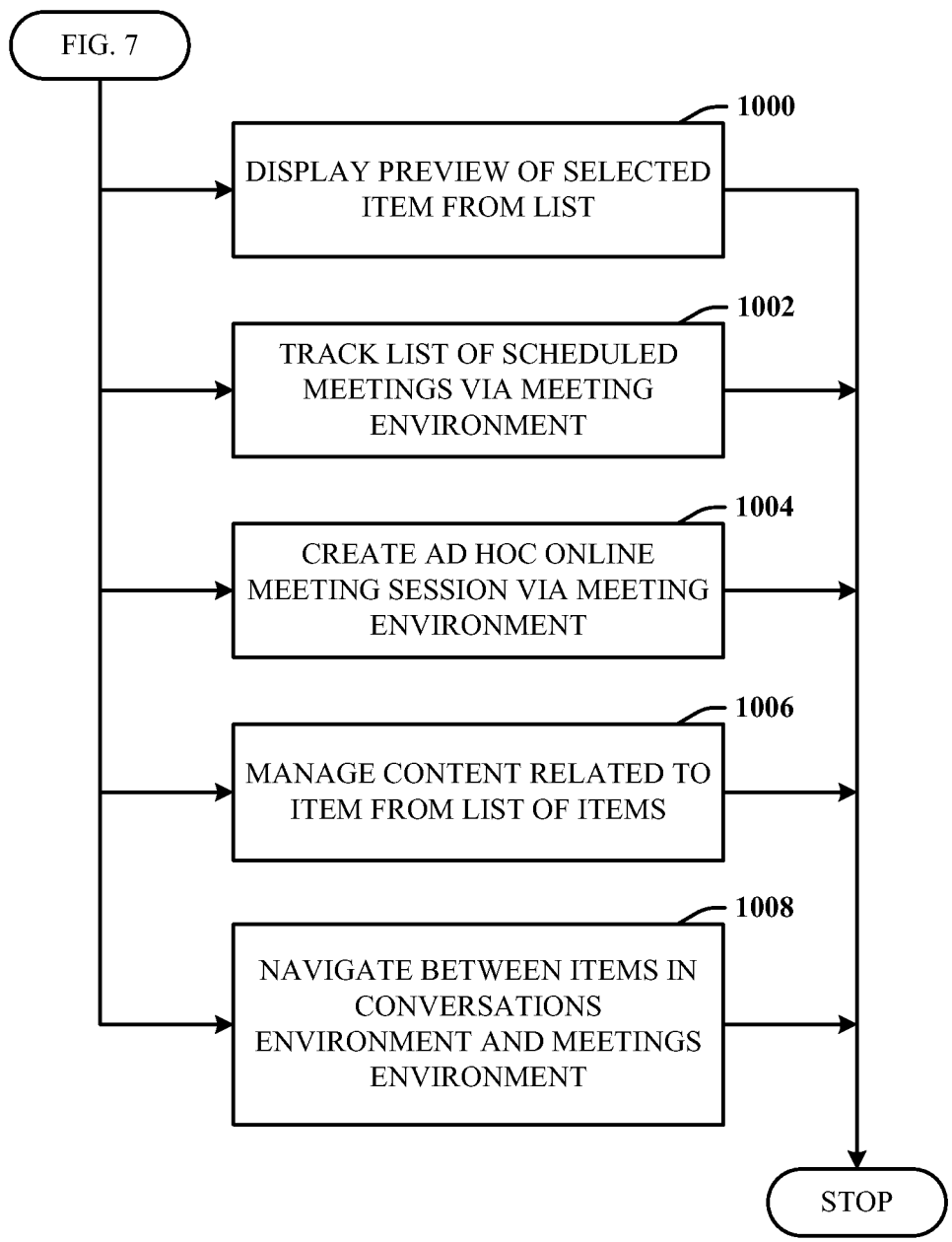
FIG. 10 illustrates still further aspects in the method of communications.

FIG. 10 illustrates still further aspects in a method of communications of FIG. 7. At 1000, a preview of the specific item from the list of items is displayed. This enables the user to review the specific item before opening. At 1002, a list of scheduled online meetings is tracked via the meetings environment. At 1004, an ad hoc online meeting can be created via the meetings environment. In this manner, the user can manage multiple meetings and create new meetings as needed. At 1006, content related to an item from the list of items can be managed. This content can be any sort of documents or files that are used during a meeting or conversation, or used before to prepare or after to review. At 1008, the user can navigate between items in the conversations environment and the meetings environment. For example, a user can select between conversations beginning with a phone calling, and into which past conversations and follow up meetings are accessed. The user can cycle between people-interactive conversation and meetings environments.

Additionally, it is to be appreciated that one or more different communications environment types can be selected in the communications application. These different communications environment types are different from the conversations environment and meetings environment, and can be suitably used for any different sort of communication that might be contemplated by a user.

Figure 11:
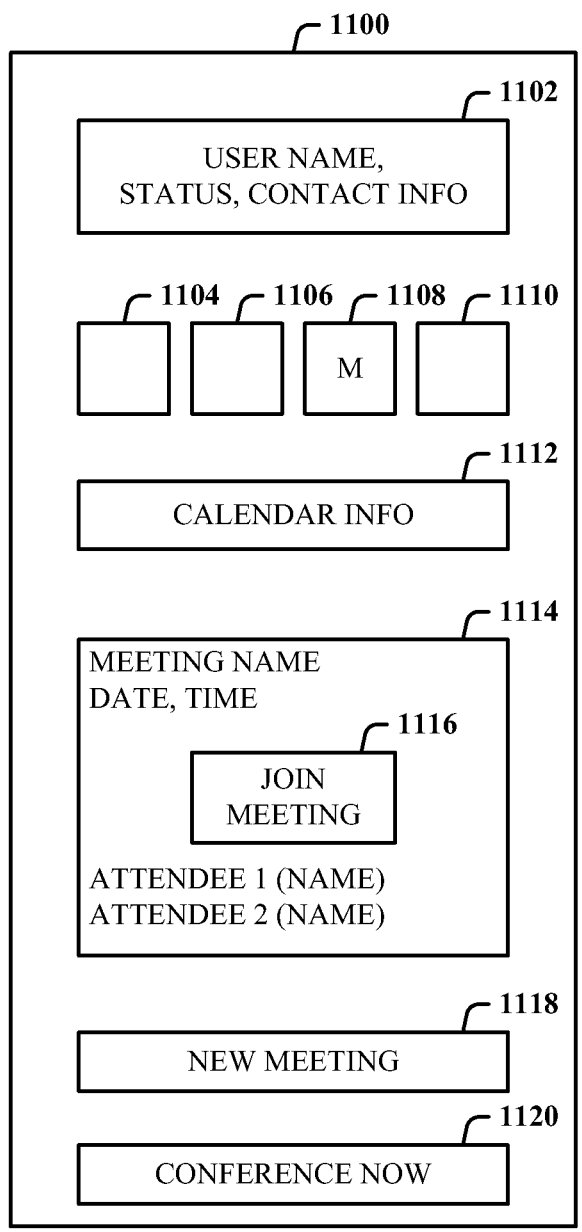
FIG. 11 illustrates a user interface for accessing a meeting environment.

FIG. 11 illustrates a user interface 1100 that can be employed by a communications application for establishing and accessing a meeting environment. It is to be appreciated that this user interface 1100 is depicted by way of example, and any suitable interface can be contemplated for implementing the intended functionality. The interface 1100 can be a graphical user interface (GUI) used with a computer, but can also be any other suitable interface comprised of buttons, panels, panes, windows, menus, and the like.

As illustrated in FIG. 11, the interface 1100 includes an identification display 1102 that can display a user name, status, contact information, and any other suitable information relevant to the user. One or more communications environments are accessible through navigation selectors, for example, a phone selector 1104, a people & groups selector 1106, a meetings selector 1108, and a conversations selector 1110. The meetings selector 1108 is indicated as selected, shown with an "M." Other fields display information relevant to meetings, and the information in these fields varies depending if another selector is selected. Calendar information 1112 is also displayed, to indicate the date and time, and the user's availability until a specific time.

FIG. 11 also shows a meeting information field 1114 that displays information of a specific meeting. This information can include the meeting name, the date, time and other identifying indicia, and a list of attendees, with attendee job titles or positions, for example. In this way, the meeting information field 1114 can display a real-time presence for meetings and attendees. At a higher level, the meeting information field 1114 can display a list of upcoming online meetings. Upon selection of a specific meeting, the meeting information field 1114 can refresh to display the aforementioned information shown in FIG. 11.

The meeting information field 1114 can also be selected to display tagged meetings. These are meetings that are tagged by the user so the meetings can be viewed inside the meeting environment. A MAPI (messaging application programming interface) property on a meeting stored in the communications application can allow querying for tagged meetings. Alternatively, the application can maintain a reference to GUIDs (globally unique IDs) of tagged meetings, as a separate object in a local or server application.

FIG. 11 also shows a join meeting button 1116 that enables the user to join a selected online meeting (e.g., with one click). A new meeting button 1118 enables the user to schedule a new meeting, and thereafter invite users to join at an appointed time. A conference now button 1120 is a one-click option that allows user to start an ad hoc collaboration session by inviting other users to a virtual conference room that is assigned to the user. Additionally, the interface 1100 can include integrated options for accessing meeting content, such as documents and files to be used during a meeting, or prior to or after the meeting. The interface 1100 can also include a search functionality to enable the user to search meetings based on metadata incorporated into a meeting file or a separate associated file.

Figure 12:
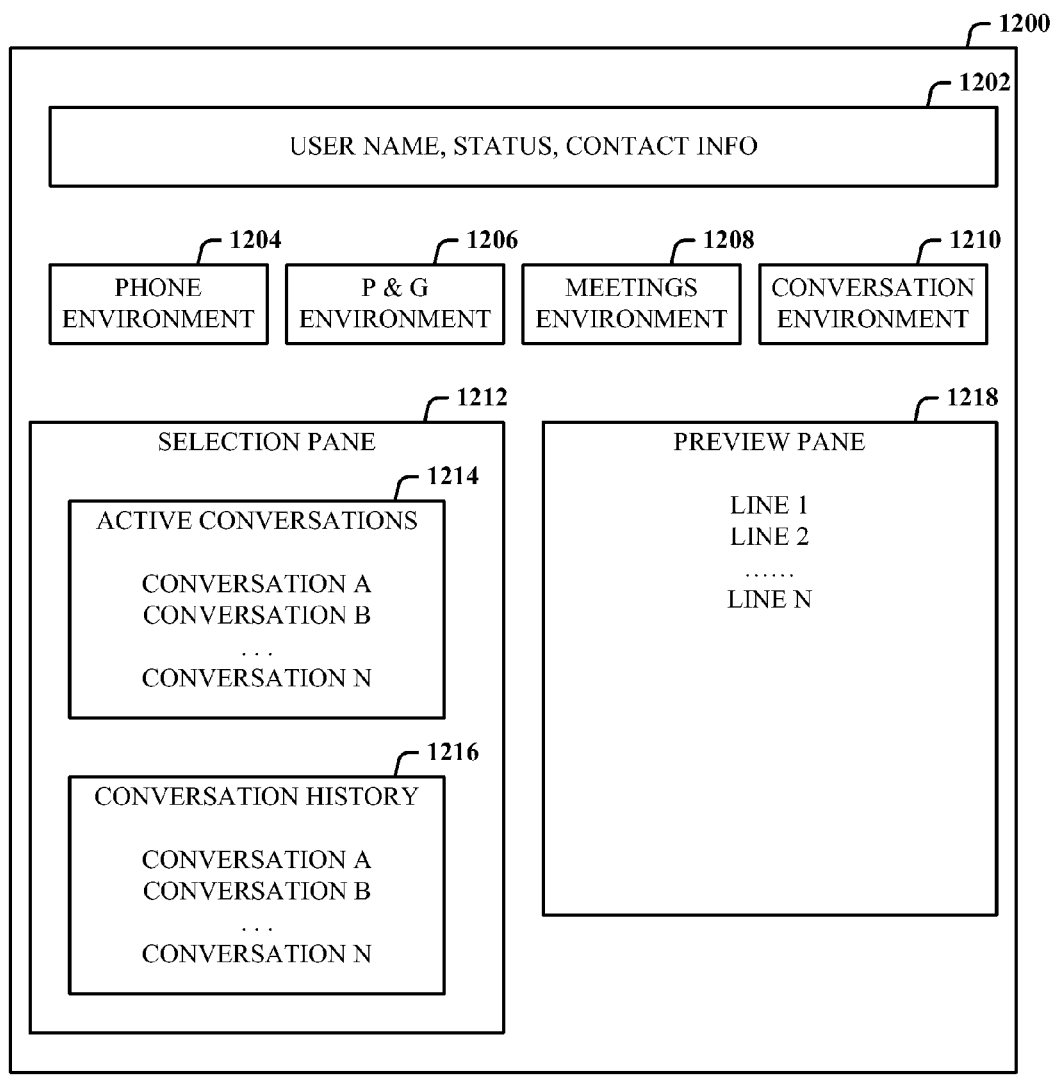
FIG. 12 illustrates a user interface for accessing a conversations environment and a meeting environment.

FIG. 12 illustrates a user interface 1200 for accessing a conversations environment and a meeting environment. The interface 1200 indicates the selection of multiple communications environments in a single communication application, and specifically depicts a conversation environment, where the associated fields display respective elements. It is to be appreciated that this user interface 1200 is depicted by way of example, and any suitable interface can be contemplated for implementing the intended functionality. The interface 1200 can be a GUI used with a computer, but can also be any other suitable interface comprised of buttons, displays and the like.

As illustrated in FIG. 12, the interface 1200 includes an identification display 1202 that can display a user name, status, contact information, and any other suitable information relevant to the user. A navigation menu of multiple communications environments is accessed by navigational tabs, including a phone environment selector 1204, a people & groups environment selector 1206, a meetings environment selector 1208, and a conversations environment selector 1210, the latter of which being the selected selector in this example. Other fields display information relevant to conversations, and the information in these fields varies in the event that another selector is selected.

FIG. 12 also shows a selection pane 1212 that displays information related to conversations. This information can include an active conversations list 1214 and a conversation history list 1216, which shows past conversations that are stored locally or on a network server. Selecting an item from the active conversation list 1214 enables a user to join a conversation thread in progress. Clicking an item from the conversation history list 1216 re-initiates the past conversation. The active conversations list 1214 and the conversation history list 1216 can include a conversation name, the date, time and other identifying indicia, including participants. The active conversations list 1214 and the conversation history list 1216 can also include identifying indicia such as the type of conversation thread, for example, whether it is instant messaging, group chat, phone call, online meeting, application sharing session, or any other suitable unified communications modality.

The selection pane 1212 illustrated in FIG. 12 can optionally include a persistent conversations list (not shown) that allows access to ongoing conversations. Persistent conversations can be held in active chat rooms created by users around topics or groups of users. These conversations can be stored on a network server to be accessed by any user at any desired time. A search feature (not shown) can be enabled to allow users to search across all types of conversations, and searching for keywords or embedded metadata tags.

FIG. 12 illustrates a preview pane 1218 that can display the contents of an active or saved conversation thread with actively accessing the thread. As depicted, the preview pane 1218 can be a line-by-line display of an instant messaging thread, also identifying the participants and the time of the conversation.

As described hereinabove, the subject embodiments provide a single application for accessing multiple communications environments, and multiple types of communications formats within a particular environment. The subject embodiments enable a user to quickly look to observe and navigate active communications and communications history items. Selecting items on lists and previewing items enables quick and convenient navigation and management, enabling users to leverage all available communications information in a single application.

Recovery Architecture

Figure 13:
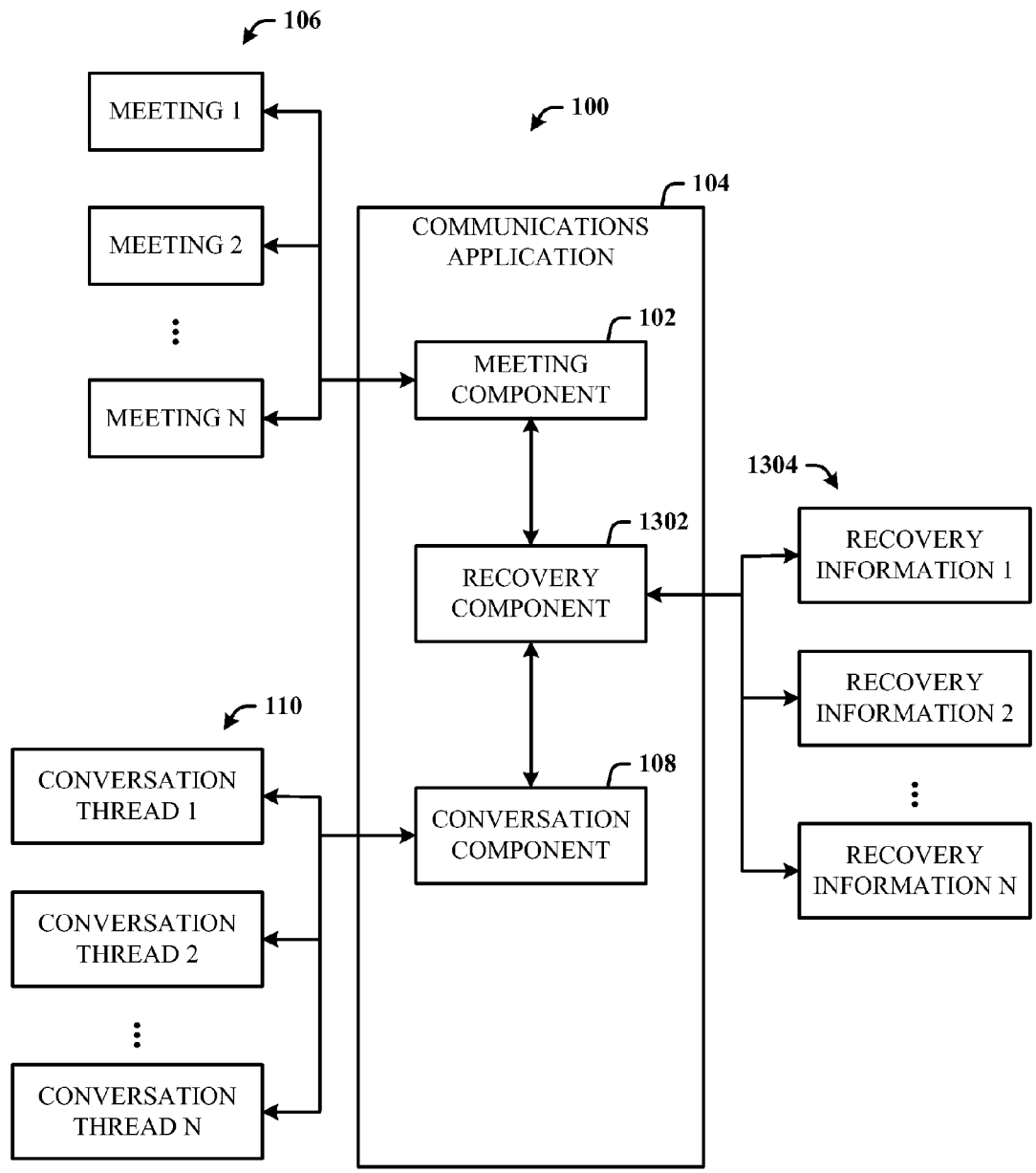
FIG. 13 illustrates aspects of a recovery component as used with the computer-implemented system for restoring communications.

FIG. 13 illustrates a computer-implemented recovery architecture and system for recovering lost communications. As previously described, the system 100 provides a single user experience for accessing multiple communications environments to facilitate communications and collaboration between users (e.g., groups). The system 100 allows users to initiate, interact and manage meetings and conversations seamlessly inside a single communications application. Additionally or alternatively, the system 100 further provides a single user experience for recovering or restoring communications items, such as active communications items 600, as managed by one or more of the multiple communications environments.

In various embodiments, the communications application 104 of the system 100 may be further augmented to include various components of a recovery architecture for the system 100. As shown in the illustrated embodiment of FIG. 13, for example, the communications application 104 may further include a recovery component 1302 arranged to store recovery information 1304. The recovery component 1302 may be generally arranged for recovering one or more communications items, such as active communications items 600, for example. Active communications items 600 may include without limitation meetings 106 or conversation threads 110 managed by respective meeting component 102 and conversation component 108 during a communication session. In various embodiments, a meeting 106 or a conversation thread 110 engaged in an active communication session may be sometimes referred to as "active meeting 106" or "active conversation thread 110."

A communications session is a semi-permanent interactive information interchange, also known as a dialogue, a conversation or a meeting, between two or more communicating devices. A communication session is set up or established at a certain point in time (e.g., a session start time) and torn down at a later point in time (e.g., a session end time). An established communication session may involve more than one message in each direction. A communications session may include stateful communications, meaning that at least one of the communicating parts needs to save information about the session history in order to be able to communicate. A communications session may also include stateless communication, where the communication comprises independent requests with responses.

In one embodiment, for example, a communications session may be implemented as part of protocols or services at an application layer, session layer or transport layer of the open systems interconnection (OSI) model. An application layer example may include a hypertext transfer protocol (HTTP) session. A session layer example may include a session initiation protocol (SIP) based Internet phone call session. A transport layer example may include a transmission control protocol (TCP) session, such as a TCP virtual circuit, a TCP connection or a TCP socket. These are merely a few examples, and an active communications item 600 may use other types of communication sessions as desired for a given implementation. The embodiments are not limited in this context.

In one embodiment, for example, a communications session may be considered an "active communications session" when there is a defined session start time and a defined session end time has not been reached. An "inactive communications session" may refer to a communications session where there is a defined session start time and a defined session end time has been reached. Determination of whether a defined session start time has occurred may be based on control signaling for completing setup of one or more communications channels for a communications session, such as control signals to request a meeting 106 or conversation thread 110 by one party, and acknowledgement accepting the request by at least one other party. Determination of whether a defined session end time has been reached may be based on an explicit termination of a communications session, such as receipt of a control signaling for completing teardown of one or more communications channels for a communications session in response to user control directive terminating the communication session, for example. In this case, receipt of a user control directive and subsequent tear down of communications channels for the communications session may be considered a defined session end time. Additionally or alternatively, determination of whether a defined session end time has been reached may be based on an implicit termination of a communications session, such as expiration of a timeout period after a last message sent by a client device for any of the parties participating in the communications session, for example. In this case, expiration of the timeout period and subsequent tear down of communications channels for the communications session may be considered a defined session end time.

Once the meeting component 102 and/or the conversation component 108 of the system 100 initiates an active communication item 600 during a communication session between two or more parties, the recovery component 1302 monitors the active communication item 600 and associated communication session to detect a recovery event. A recovery event may generally comprise any event that causes termination of a communications session before a defined session end time. In some cases, a recovery event is an error case that prematurely or unexpectedly disrupts, disconnects, interrupts or otherwise terminates a communication session before normal completion. In one embodiment, for example, a recovery event may comprise any event that causes a communication session for an active communication item 600 to terminate before a defined session end time. Examples of recovery events may include interruptions caused by network disconnect, network failure, device failure, component failure, hardware failure, software failure, communications stack failure, radio failure, radio channel failure, signal interference (e.g., drop in signal-to-noise ratio), power conservation measures, power failure, user error (e.g., accidental depressing end call button), third party error (e.g., severed lines), undocking event, rebooting event, timeout event, disconnect event, and any other events and errors that unexpectedly interrupts a communication session. The embodiments are not limited to these examples.

Upon detection of a recovery event, the recover component 1302 may utilize recovery information 1304 associated with the interrupted communications session to automatically restart, reestablish, restore or otherwise recover the communications session. The recovered communications session may include identical or similar characteristics as the interrupted communications session, including without limitation the same or similar participants, device parameters, communications parameters, security parameters, privacy parameters, meeting content, communications history, messages, and so forth. In some cases, a communications session before a recovery event may be referred to as a "communications session" or "first communications session" while a communications session after a recovery event may be referred to as a "recovered communications session" or "second communications session." However, such terminology is meant interchangeably and designed to convey a concept that communications sessions before and after a recovery event are similar or identical communications sessions. In other words, communications sessions before and after a recovery event are different versions of a same communications session.

Figure 14:
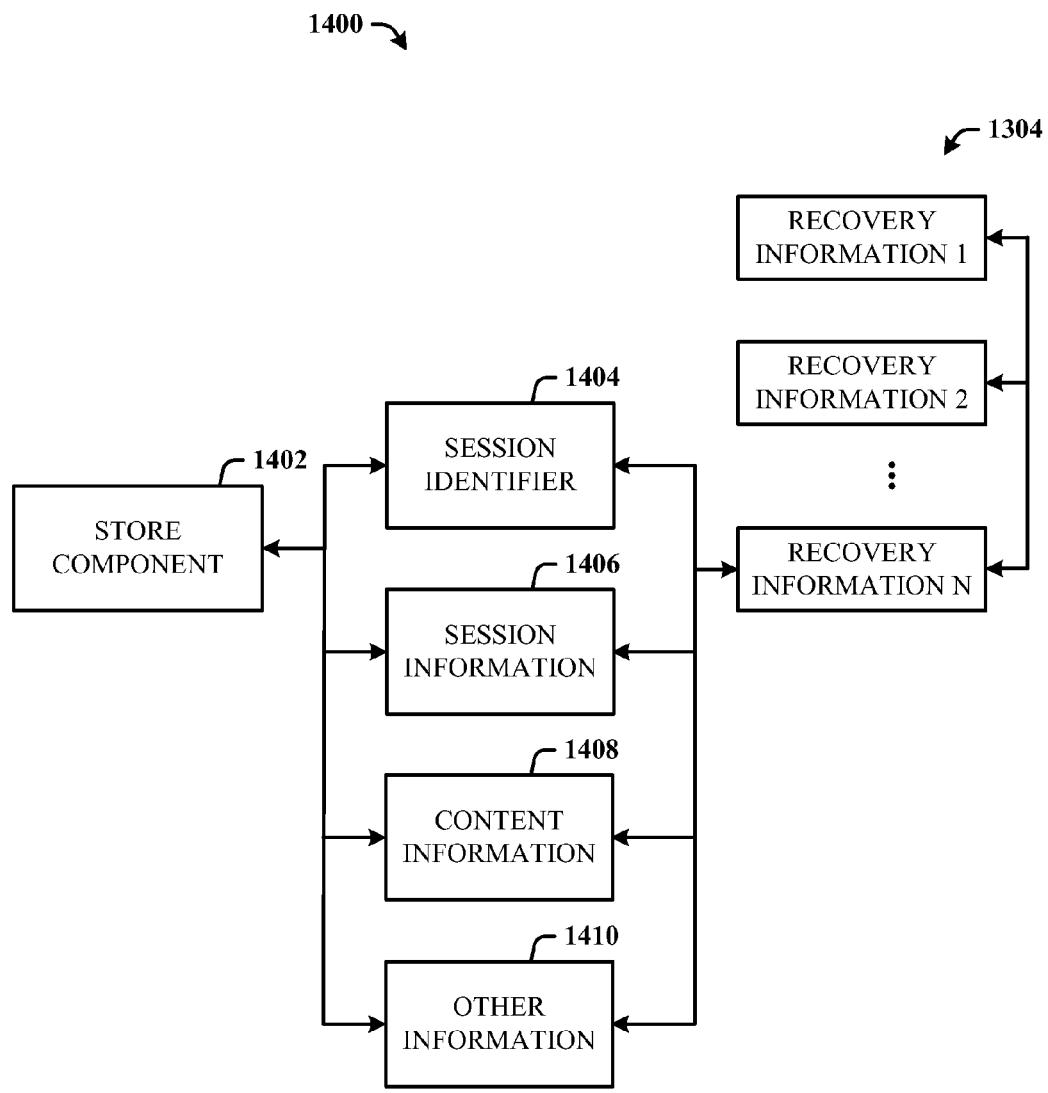
FIG. 14 illustrates aspects of a store component as used with the computer-implemented system for restoring communications.

FIG. 14 illustrates an operating environment 1400 illustrating aspects of a store component 1402 as used with the recovery component 1302 of the system 100. The store component 1402 may be generally arranged to control and manage storage operations for different sets of recovery information 1304 related to an active communications item 600, such as one of the multiple meetings 106 or multiple conversation threads 110, for example. The store component 1402 may store different types of information as recovery information 1304, including a session identifier 1404, session information 1406, content information 1408, and other information 1410. It may be appreciated that more or less types of information may be stored as recovery information 1304 as needed for a given implementation, and the embodiments are not limited in this context.

In one embodiment, the store component 1402 may store recovery information 1304 utilizing a session identifier 1404. The session identifier 1404 may comprise a globally unique identifier (GUID) that uniquely identifies one or more communications session of an active communications item 600 and associated set of recovery information 1304. The session identifier 1404 may be assigned by a client device or a server device, and is typically assigned at a session start time for a communications session. The store component 1402 may use the session identifier 1404 to create or locate an associated set of recovery information 1304 from a file system. The store component 1402 may then add, delete, or modify information stored by a file with the set of recovery information 1304. For instance, sometime after a communications session for an active communications system 600 is first established, a session identifier 1404 is created and assigned to the communications session and/or the active communications item 600. Once assigned, the store component 1402 may use the session identifier 1404 to store recovery information 1304 for the active communications item 600. The store component 1402 may store recovery information 1304 at different time intervals according to a schedule on a periodic, aperiodic or continuous basis, as desired for a given implementation.

The store component 1402 may store recovery information 1304 comprising session information 1406. Session information 1406 may include any control and signaling information for establishing (e.g., set up information), managing and terminating (e.g., tear down information) a communications session. Examples of session information 1406 may include without limitation application parameters, hardware parameters, software parameters, device parameters, network parameters, communications parameters, protocol information, state information, configuration information, security information, privacy information, and so forth.

The store component 1402 may store recovery information 1304 comprising content information 1408. Content information 1408 may include any multimedia content intended for human consumption and communicated during a communication session. Examples of content information 1408 may include without limitation text information, voice information, video information, audio information, image information, animation information, application programs, application program files, meeting content, shared documents, whiteboards, web sites, web services, web applications, chat information, messaging information, and so forth.

The store component 1402 may store recovery information 1304 comprising other information 1410. Recovery information 1304 may further include other useful types of information, such as user profile information, metadata associated with a set of recovery information 1304, financial information, security credentials, permission parameters associated with a set of recovery information, time stamps, storing parameters (e.g., store intervals), defined recovery events, and so forth.

Figure 15:
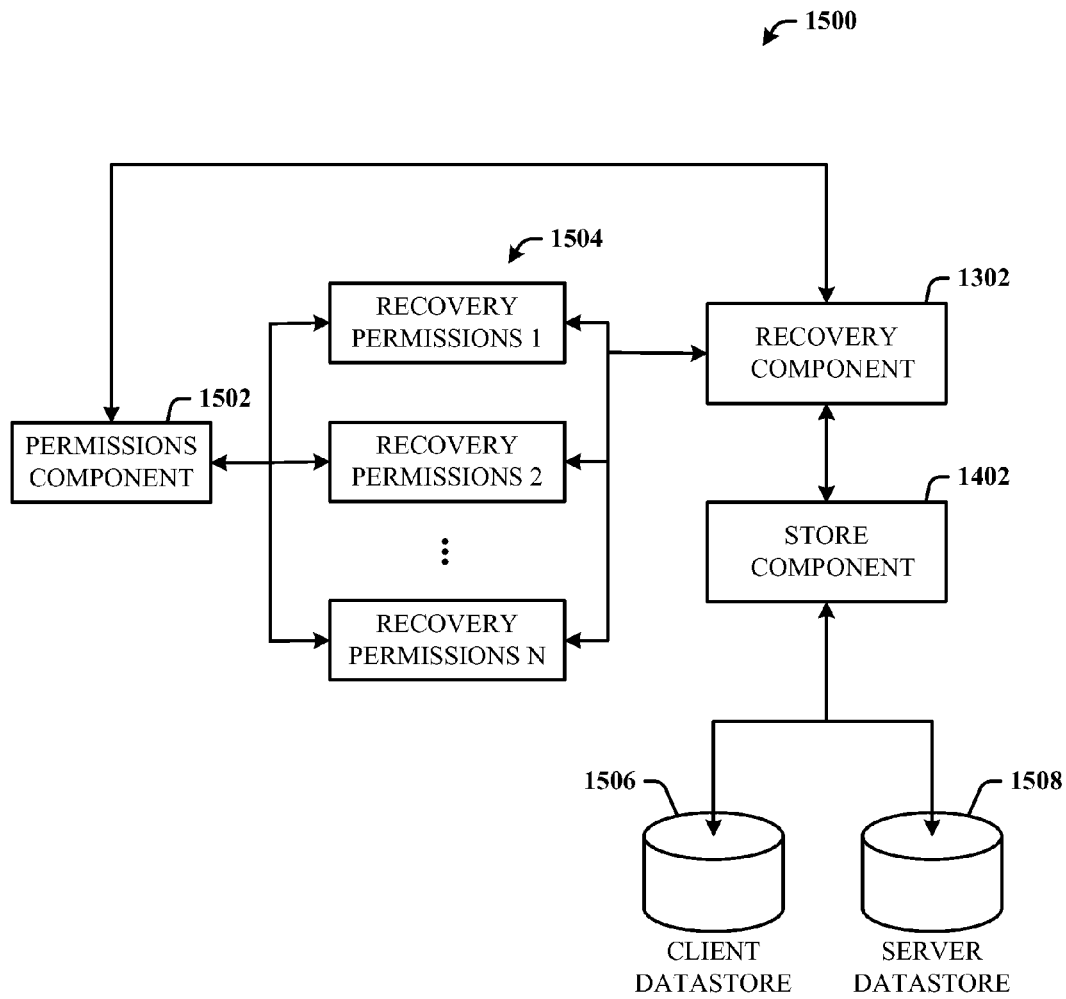
FIG. 15 illustrates a permissions component to store recovery information.

FIG. 15 illustrates an operating environment 1500 illustrating a permissions component 1502 to store recovery information 1304. The permissions component 1502 may be generally arranged to define and store a set of recovery permissions 1504. The store component 1402 may use recovery permissions 1504 to manage storage operations for recovery information 1304. The recovery component 1302 may further use recovery permissions 1504 to manage recovery operations using recovery information 1304. Each set of recovery permissions 1504 may be created and associated with a specific user, application, device, network, communications session, active communications item 600, a meeting 106, a conversation thread 110, and/or a set of recovery information 1304. Examples for recovery permissions 1504 may include authentication information for a device or user, security information, authorization information, privacy information, priority information, quality of service (QoS) information, and storage location information, among other types of information.

The recovery permissions 1504 may define various storage parameters for storing recovery information 1304. For instance, assume a client device such as a smart phone or tablet computer has limited memory and/or processing capabilities. A user may access permissions component 1502 to define a set of recovery permissions 1504 indicating that recovery information 1304 should be stored on the server datastore 1508 of a server device. This configuration may have a benefit of using greater memory and/or processing resources as offered by a typical server device, although at a cost of increased bandwidth requirements and latency in transmitting recovery information 1304 over a network between a client device and the server device. Alternatively, a user may access permissions component 1502 to define a set of recovery permissions 1504 indicating that recovery information 1304 should be stored on the client datastore 1508 of a client device. This may be appropriate for client devices having a greater amount of memory and processing resources, such as a notebook or desktop computer. This configuration may have a benefit of decreasing bandwidth requirements and latency at a cost of increased use of local memory and processing resources. Other examples of storage parameters suitable for recovery permissions 1504 may include specific storage locations, conditional storage locations based on a meeting type, conversation thread type, or application type, and so forth.

The recovery permissions 1504 may define various recovery parameters for recovering a communications session using recovery information 1304. Continuing with our previous example, assume a user has a first client device such as a smart phone with limited display capabilities. If a recovery event occurs, the user may define a recovery parameter that only recovers a partial history for a meeting 106 or conversation thread 110 that fits within a display area of the smart phone. Further assume the user has a second client device such as a tablet computer with larger display capabilities relative to the smart phone. If a recovery event occurs, the user may define a recovery parameter that recovers a full history for a meeting 106 or conversation thread 110 due to the larger display area. Additional examples of other recovery parameters suitable for recovery permissions 1504 may include recovering communications sessions based on priority level (e.g., recover only higher priority calls not lower priority calls), application program (e.g., recover only short messaging service sessions not multimedia messaging service sessions), modality (e.g., recover only voice calls not video calls), participants (e.g., recover history for business associates not personal friends), time of day (e.g., recover full history during business hours and partial history during personal hours), location (e.g., recover full history when at office and partial history when at home), user preferences (e.g., recover partial history initially and additional history amounts based on subsequent requests), and so forth.

Figure 16:
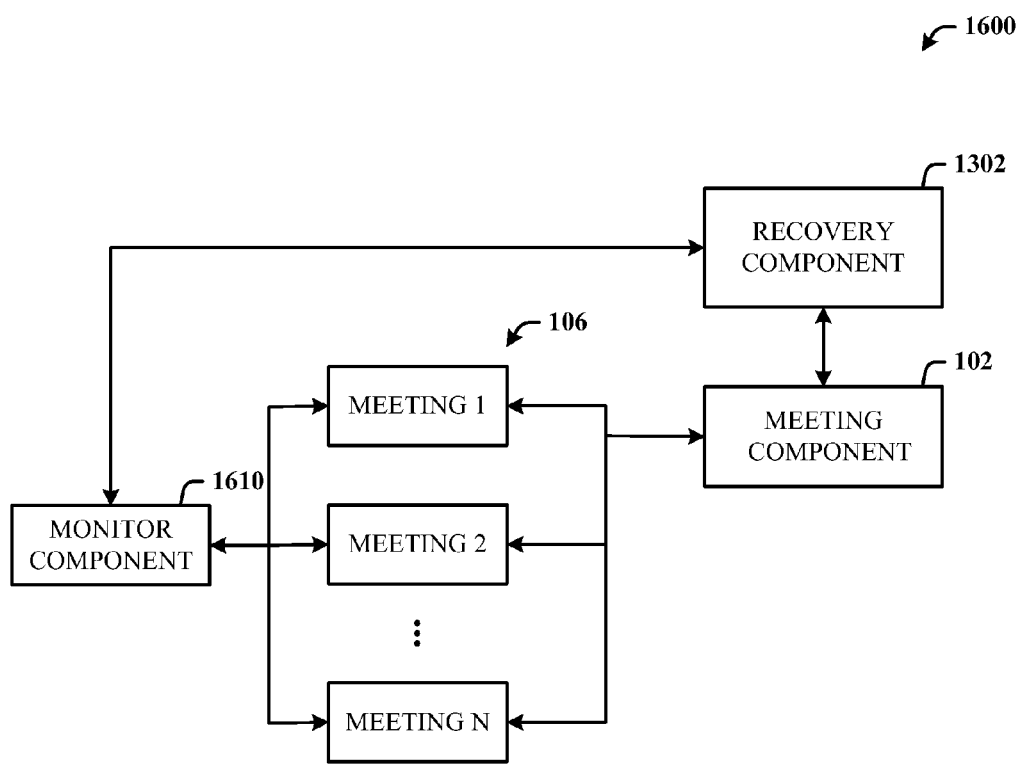
FIG. 16 illustrates a monitor component for monitoring meetings.

FIG. 16 illustrates an operating environment 1600 that illustrates a monitor component 1610 for monitoring meetings 106. The monitor component 1610 may be generally arranged for monitoring active communications items 600, such as active meetings 106, to detect a recovery event. The monitor component 1610 may monitor various aspects, characteristics, attributes or properties for active meetings 106 and/or the meeting component 102 to detect recovery events, such as a disconnect event, for example. For instance, the monitor component 1610 may monitor a radio channel for a radio connecting a client device to a network device, and detect when the radio channel is terminated without an explicit control directive received from a user (e.g., caller or callee). In another example, the monitor component 1610 may monitor a communications stack to detect when the communications stack or a layer from the communications stack becomes unstable and terminates. In yet another example, the monitor component 1610 may monitor an application program (e.g., a conferencing application) to detect an unexpected termination or crash of the application program. In still another example, the monitor component 1610 may monitor a system program such as an operating system to detect a system crash. In yet another example, the monitor component 1610 may monitor a communications channel for a silent period that exceeds a defined time period, and assume failure of a remote client device as a recovery event. The monitor component 1610 may monitor other aspects associate with an active meeting 106, such as loss of radio signals, power conservation measures, hardware failures, software failures, biometrics, and so forth.

Figure 17:
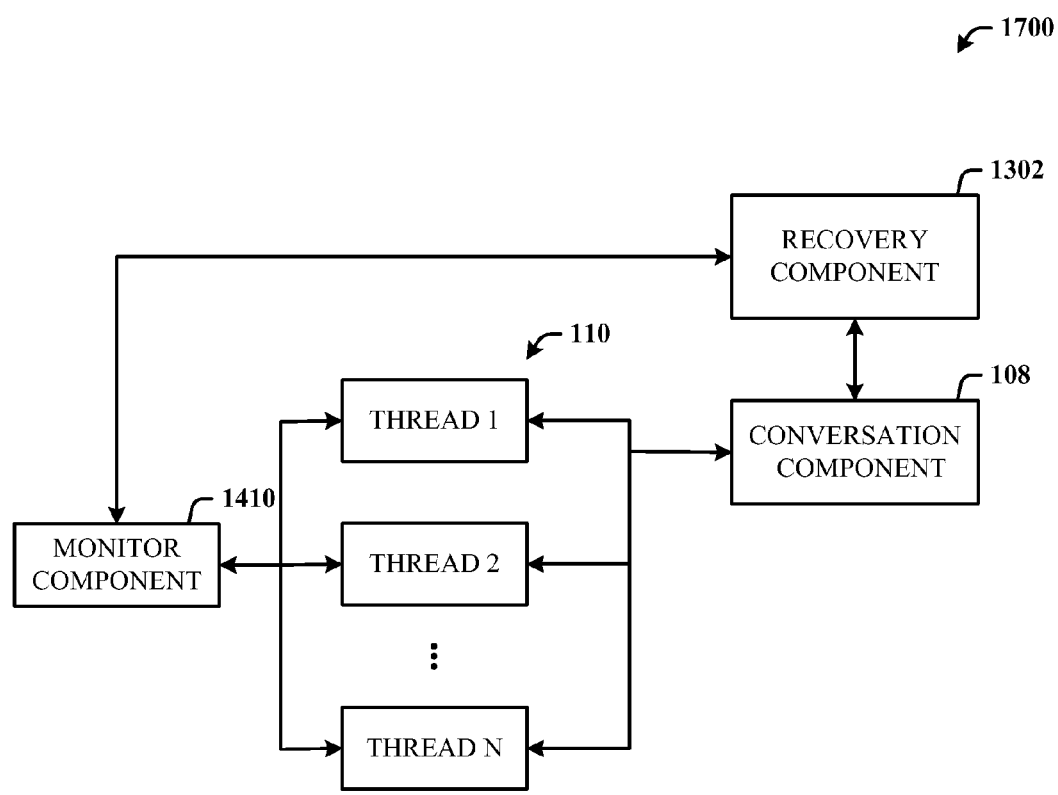
FIG. 17 illustrates a monitor component for monitoring conversation threads.

FIG. 17 illustrates an operating environment 1700 that illustrates a monitor component 1610 for monitoring conversation threads 110. The monitor component 1610 may be generally arranged for monitoring active communications items 600, such as active conversation threads 110, to detect a recovery event. The monitor component 1610 may monitor various aspects, characteristics, attributes or properties for active conversation threads 110 and/or the conversation component 108 to detect recovery events, such as a disconnect event, for example. Examples of monitoring operations for the monitor component 1610 may be similar to those given for the active meetings 106 and the meeting component 102 as described with reference to FIG. 17, among others.

Figure 18:
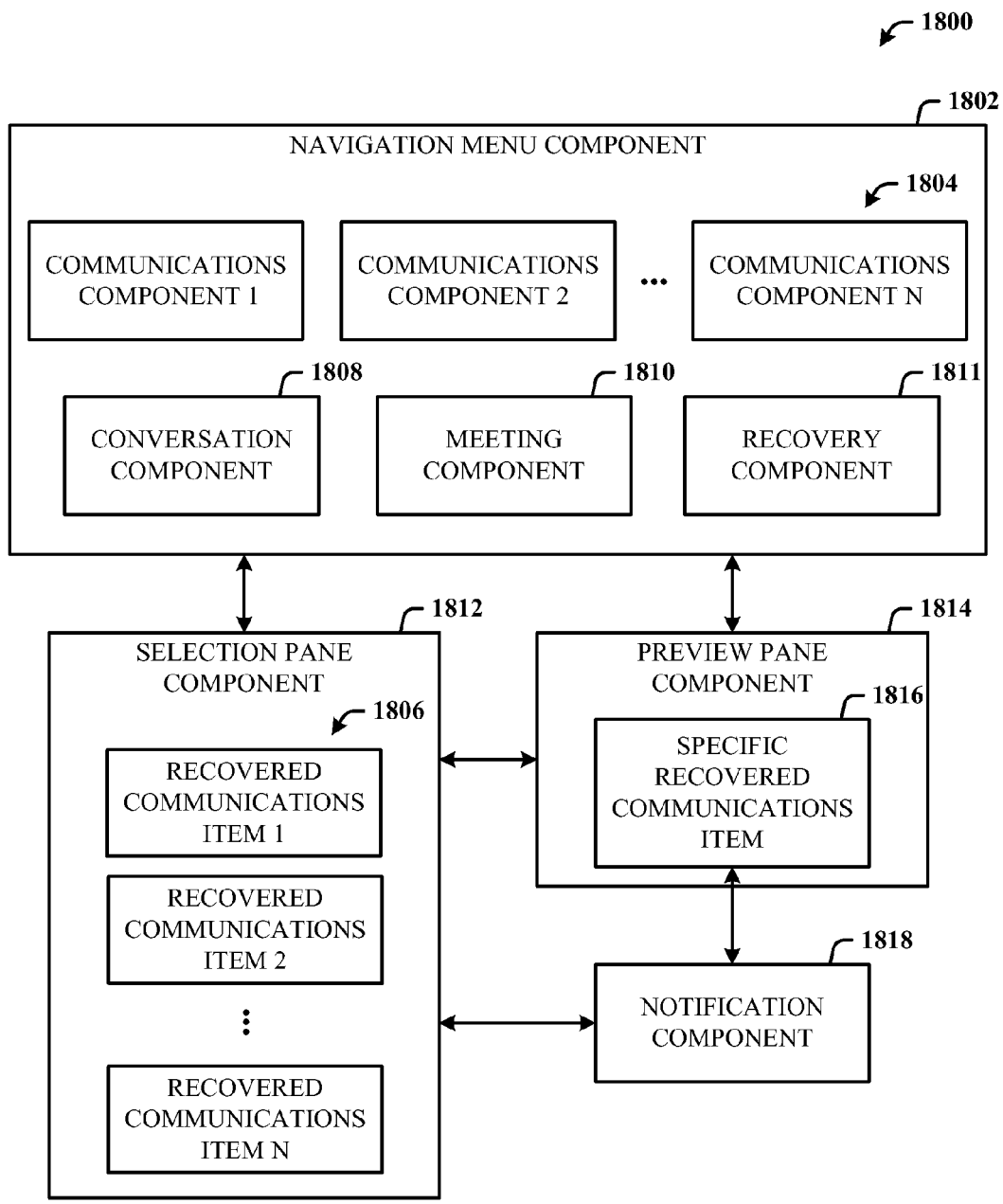
FIG. 18 illustrates additional aspects of types of recovered communications items displayed in a selection pane.

FIG. 18 illustrates a communications system 1800 that illustrates additional aspects of types of recovered communications items 1806. FIG. 18 illustrates a computer-implemented communications system 1800 comprising a navigation menu component 1802 arranged for selecting between communications components 1804 that include active communications items 600, such as active meetings 106 and active conversation threads 110. The communications components 1804 may include, among other components, a conversation component 1808, a meeting component 1810, and a recovery component 1811. The conversation component 1808, the meeting component 1810, and the recovery component 1811 may be representative of the respective conversation component 104, the meeting component 102, and the recovery component 1302, for example.

FIG. 18 illustrates a conversation component 1808 of a real-time version of the communications application 104 in which an active communications item 600 comprises at least one active conversation thread 106 in a conversation format. Examples of conversation formats may include formats associated with instant messaging, group chat, a telephone call, voice, video, email, application sharing, or an online meeting, among others.

FIG. 18 further illustrates a meeting component 1810 of the real-time version of the communications application 104 in which an active communications item 600 comprises at least one active meeting.

FIG. 18 still further illustrates a recovery component 1811 of the real-time version of the communications application 104 to recover one or more active communications items 600 in response to a recovery event. A selection pane component 1812 may display a list of recovered communications items 1806. A preview pane component 1814 may display a preview of a specific recovered communications item 1816 from the list.

FIG. 18 still further illustrates a notification component 1818 of the real-time version of the communications application 104 for indicating whether recovery operations for a recovered communications item 1806 have succeeded or failed. The notification component 1818 may notify a user of a status for recovery operations. The notification component 1818 can be a flag or icon or other visually discernable element, on the interface for example, that draws attention to that specific conversation. The notification component 1818 can notify the user of recovered communications items 1806, and also if an active communications item 600 cannot be recovered. In some cases, the notification component 1818 can comprise a dialog indicating an error or event message, and corrective actions, if needed. The notification component 1818 can also include an audible indicator to audibly alert the user.

Figure 19:
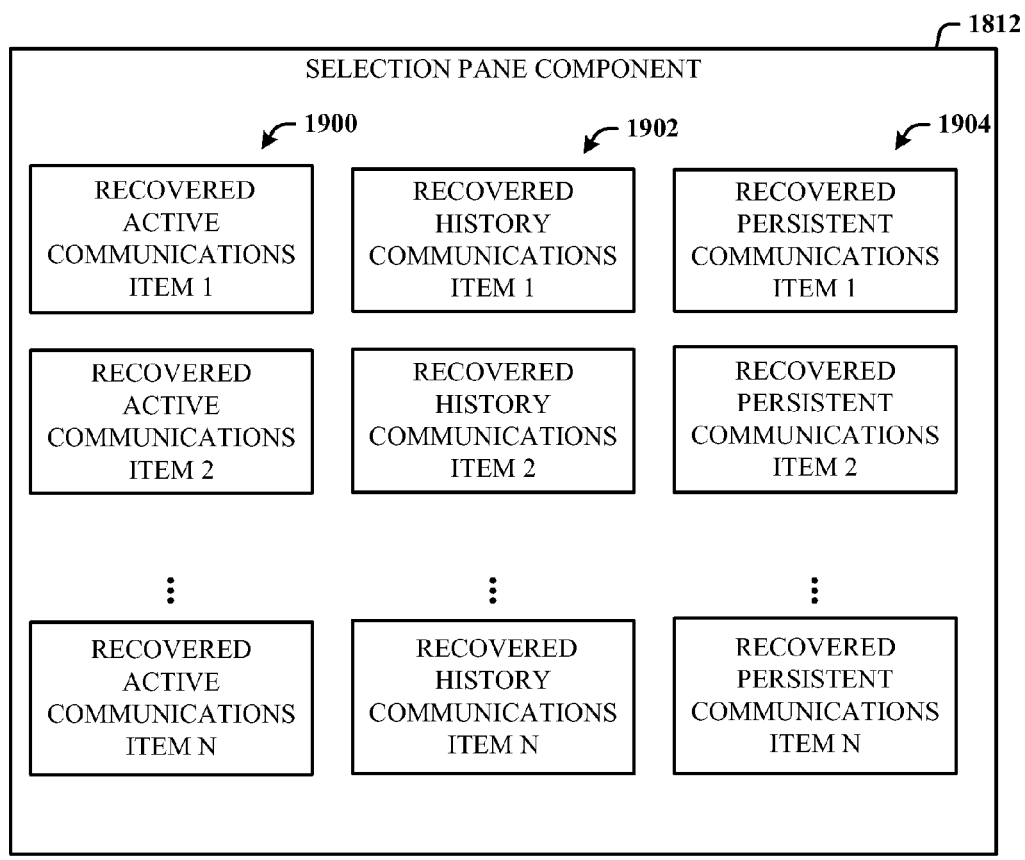
FIG. 19 illustrates additional aspects of types of conversations items displayed in a selection pane.

FIG. 19 illustrates additional aspects of the types of conversations items displayed in the selection pane component 1812. The selection pane component 1812 includes a list of recovered active communications items 1900. This can include active conversation threads or active meetings. The selection pane component 1812 can also include a list of recovered history communications items 1902, which can include past conversation threads and past meetings. For instance, recovered history communications items 1902 may include active communications items 600 that have become inactive due to normal termination, such as reaching a session end time, for example. A list of persistent communications items 1904 can also be presented in the selection pane component 1812, which include ongoing communications between multiple user participants outside of a real-time communications session, such as IM message threads lasting several days, weeks or months.

Although certain embodiments focus on recovering active communications items 600, the recovery component 1302 may recover different types of inactive communications items, such as history communications items 602 and persistent communications items 604, for example. For instance, when an active communications item 600 is terminated normally and becomes inactive, it may become a history communications item 602 or a persistent communications item 604. The recovery information 1304 for the previously active communications items 600 may be archived for recovering the history communications item 602 or the persistent communications item 604. For example, if a user wanted to restart the history communications item 602 or the persistent communications item 604, the recovery information 1304 may be used to establish a new active communications session for the history communications item 602 or the persistent communications item 604 to convert one or both into an active communications item 600. In another example, if a client device is lost, stolen or deactivated, or its file system is lost or corrupted, the client device or a replacement client device may be loaded with the history communications item 602 or the persistent communications item 604 via the associated recovery information 1304 to form recovered history communications items 1902 or recovered persistent communications items 1904.

As with FIGS. 7-12, FIGS. 20-23 may comprise a set of flow charts representative of exemplary methodologies for performing novel aspects of the disclosed architecture of FIGS. 13-19. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 20:
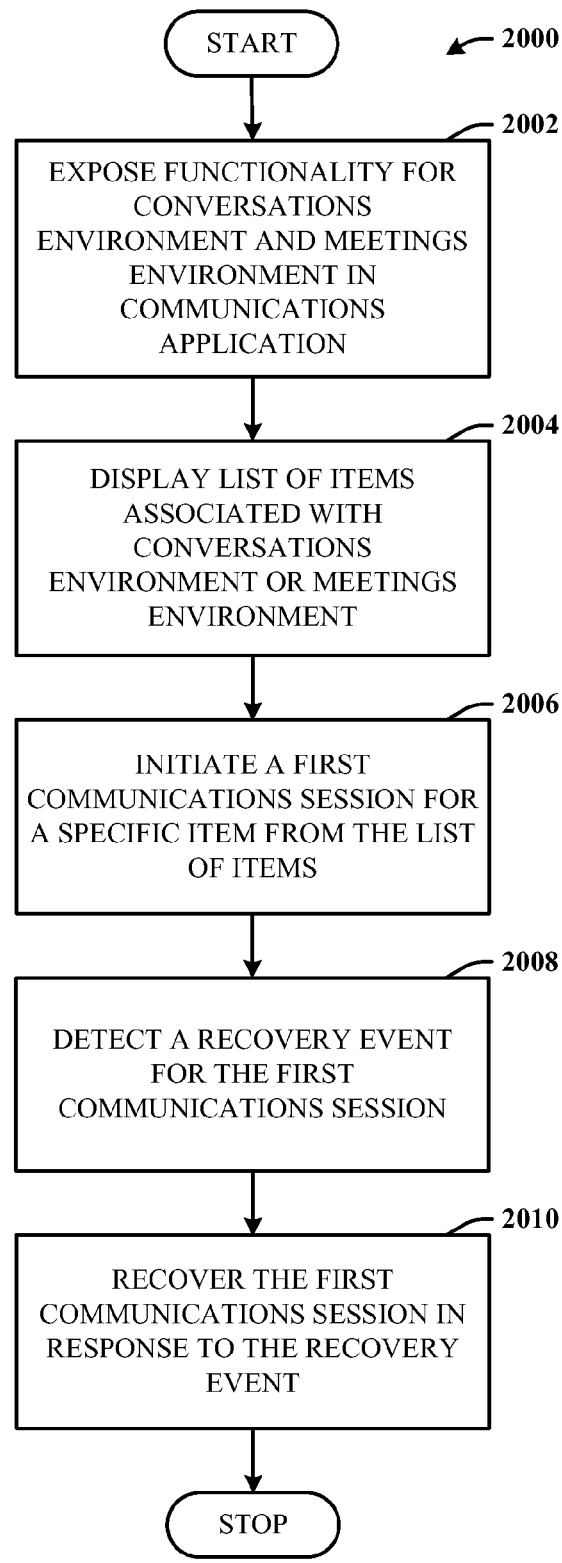
FIG. 20 illustrates a method of restoring communications.

FIG. 20 illustrates a logic flow 2000 for restoring active communications items 600. In one embodiment, for example, the logic flow 2000 may be executed by the real-time communications application 104 of the system 100.

The logic flow 2000 may expose functionality for a conversations environment and a meetings environment in a communications application at block 2002. For example, the navigations menu components 502, 1802 may expose functionality for a conversations environment and a meetings environment in a communications application 104.

The logic flow 2000 may display a list of items associated with the conversations environment or the meetings environment at block 2004. For example, the selection pane component 512 may display a list of active communications items 506, 600 associated with the conversations environment or the meetings environment.

The logic flow 2000 may initiate a first communications session for a specific item from the list of items at block 2006. For example, the communications application 104 may initiate a first communications session for a specific communications item 516 from the list of active communications items 506, 600.

The logic flow 2000 may detect a recovery event for the first communications session at block 2008. For example, the monitor component 1610 may detect a recovery event for the first communications session for the specific communications item 516 from the list of active communications items 506, 600.

The logic flow 2000 may recover the first communications session in response to the recovery event at block 2010. For example, the recovery component 1302 may recover the first communications session in response to the recovery event to form a recovered active communications item 1900.

Figure 21:
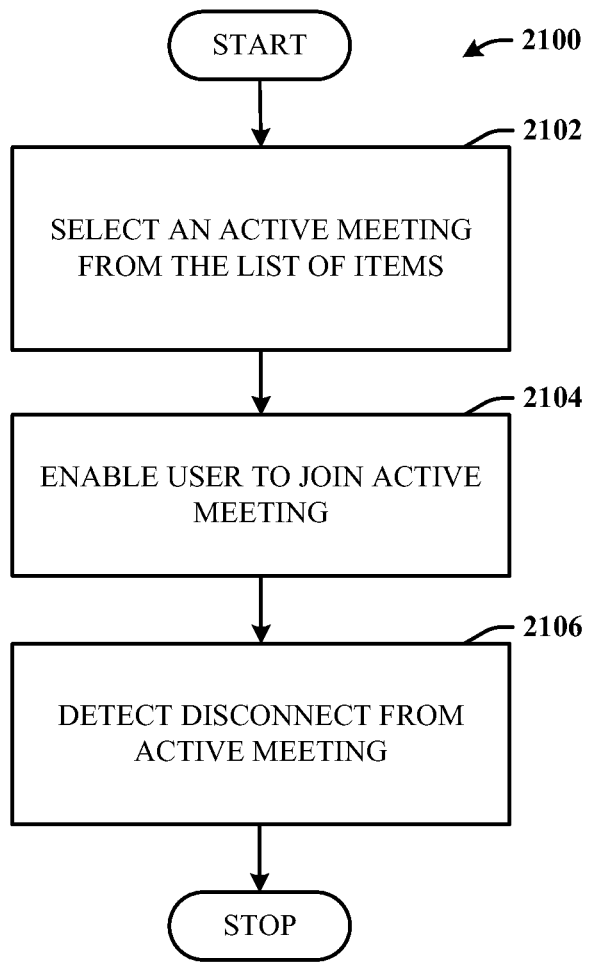
FIG. 21 illustrates further aspects in the method of restoring communications.

FIG. 21 illustrates a logic flow 2100 for restoring active communications items 600. In one embodiment, for example, the logic flow 2100 may also be executed by the real-time communications application 104 of the system 100. For example, the logic flow 2100 may illustrate initiation of different types of active communications items 600, such as an active meeting 106, and detection of recovery events for the active meeting 106.

The logic flow 2100 may initiate a first communications session for a specific item comprising an active meeting. For example, the communications application 104 may initiate a first communications session for a specific communications item 516 comprising an active meeting 106.

The logic flow 2100 may select an active meeting from the list of items at block 2102. For example, the communications application 104 may select an active meeting 106 from the list of active communications items 506 in response to a user control directive.

The logic flow 2100 may enable a user to join an active meeting at block 2104. For example, the communications application 104 may initiate a first communications session for the selected active meeting 106.

The logic flow 2100 may detect a disconnect from the active meeting at block 2106. For example, the monitor component 1610 may detect a recovery event in the form of a disconnect event for the active meeting 106. A disconnect event may comprise a client device disconnecting from a network used for communicating with another client device or a server device.

Figure 22:
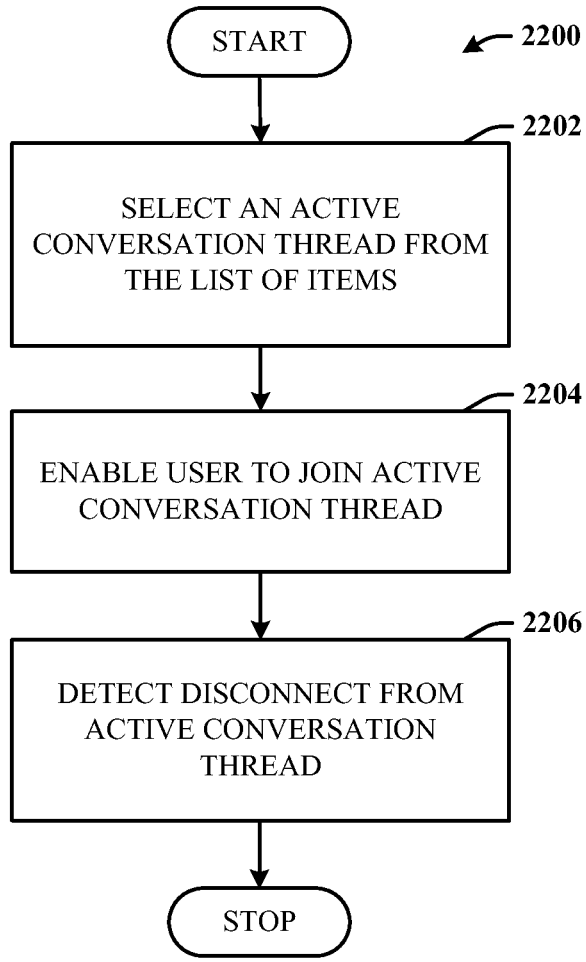
FIG. 22 illustrates additional aspects in the method of restoring communications.

FIG. 22 illustrates a logic flow 2200 for restoring active communications items 600. In one embodiment, for example, the logic flow 2200 may also be executed by the real-time communications application 104 of the system 100. For example, the logic flow 2100 may illustrate initiation of different types of active communications items 600, such as active conversation threads 110, 402, and detection of recovery events for the active conversation threads 110, 402.

The logic flow 2200 may initiate a first communications session for a specific item comprising an active conversation thread 402. For example, the communications application 104 may initiate a first communications session for a specific communications item 516 comprising an active conversation thread 402.

The logic flow 2200 may select an active conversation thread from the list of items at block 2102. For example, the communications application 104 may select an active conversation thread 402 from the list of active communications items 506 in response to a user control directive.

The logic flow 2200 may enable a user to join an active meeting at block 2204. For example, the communications application 104 may initiate a first communications session for the selected active conversation thread 402.

The logic flow 2100 may detect a disconnect from the active conversation thread at block 2206. For example, the monitor component 1610 may detect a recovery event in the form of a disconnect event for the active conversation thread 402. A disconnect event may comprise a client device disconnecting from a network used for communicating with another client device or a server device.

Figure 23:
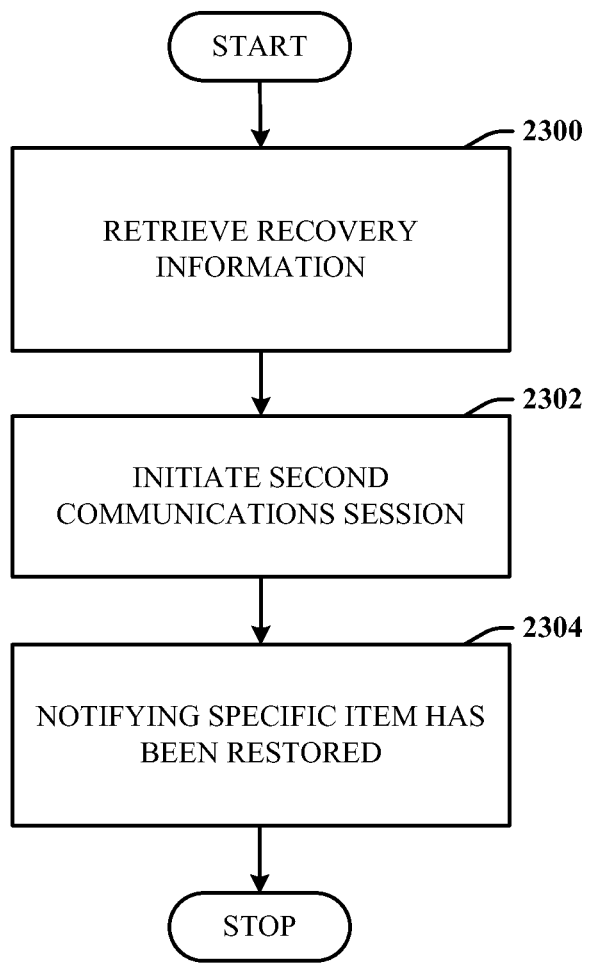
FIG. 23 illustrates still further aspects in the method of restoring communications.

FIG. 23 illustrates a logic flow 2300 for restoring active communications items 600. In one embodiment, the logic flow 2300 may also be executed by the real-time communications application 104 of the system 100. For example, in response to detection of a recovery event, the recovery component 1302 may initiate recovery operations to recover a lost active communications item 600. The recovery component 1302 may automatically initiate recovery operations once a recovery event is detected. Alternatively, the recovery component 1302 may notify a user of a recovery event, prompt a user for instructions, and receive a user control directive with instructions to recover the first communication session. For instance, a GUI view may illustrate different options for a user using conventional audio, visual and tactile GUI elements, such as icons, buttons, vibrations, blinking lights, sounds, animations, and so forth. The GUI view may be specifically arranged to allow a user fast acquisition of available options and convenient initiation of recovery operations if desired.

The logic flow 2300 may retrieve recovery information at block 2300. For example, the recovery component 1302 may retrieve recovery information 1304 associated with a specific communications item 516 from a local datastore, such as the client datastore 1506, in response to the recovery event. Additionally or alternatively, the recovery component 1302 may retrieve recovery information 1304 associated with a specific communications item 516 from a remote datastore, such as the server datastore 1508, in response to the recovery event.

The logic flow 2300 may initiate a second communications session at block 2302. For example, the recovery component 1302 may initiate a second communications session having one or more communications parameters of the first communication session using recovery information 1304 associated with the specific communications item 516. Additionally or alternatively, the recovery component 1302 may initiate a second communications session having one or more content items of the first communication session using recovery information 1304 associated with the specific communications item 516. It may be appreciated that the second communications sessions may represent a partial or full reconstruction of the first communications session to allow ongoing communications between participants until normal termination of the active communications item 600 has occurred (e.g., a defined session end time).

The recovery component 1302 may attempt to construct the second communications session and restore any content items previously used or communicated prior to the recovery event differently based upon the specific type of active communications item 600. For instance, when an active communications item 600 is an active conversation thread 110 comprising a voice conversation, the recovery component 1302 may only attempt to recover a communications session and not reproduce any previous audio information or voice information transmitted prior to a recovery event. Such reproduction may impair future voice communications once the second communications session has been established. However, when an active communications item 600 is an active conversation thread 110 comprising text messages (e.g., chat messages, SMS message, MMS messages, and so forth), the recovery component 1302 may restore both the communications session and previous text messages communicated prior to a recovery event. A type and amount of content information reproduced or rehydrated for a second communications session may vary according to a given type of active communications item 600 and associated modality (e.g., audio, visual, sensory) as desired for a given implementation. Similarly, a second communications session for an active communications item 600 for an active meeting 106 may include previous meeting notes, chat messages, shared documents, whiteboard information, shared applications, and so forth. The embodiments are not limited in this context.

The logic flow 2300 may present a notification indicating the specific item has been restored at block 2304. For example, the notification component 1818 may present a notification indicating the specific communications item 516 has been restored to form a recovered communications item 1806.

Figure 24:
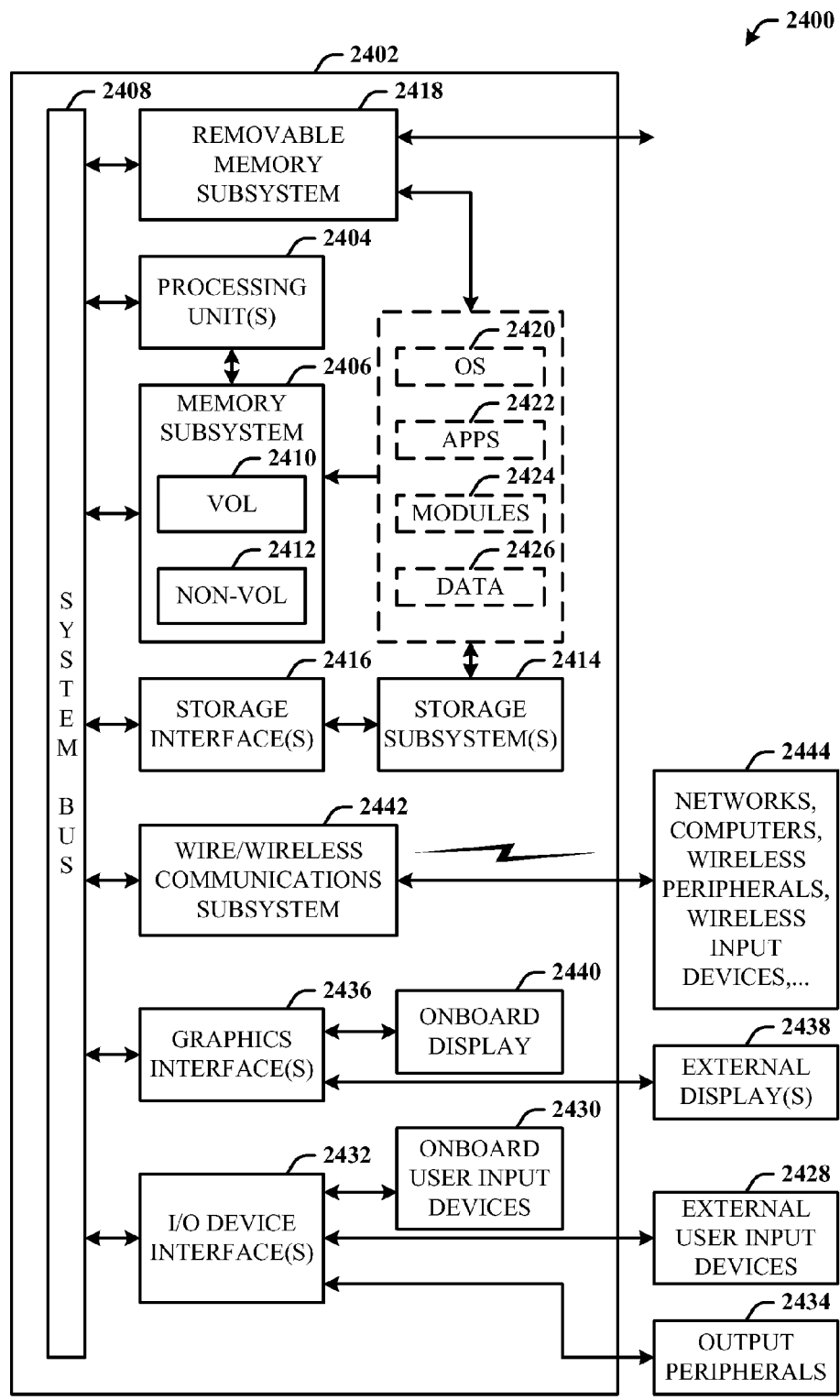
FIG. 24 illustrates a block diagram of a computing system operable to execute the communications in accordance with the disclosed architecture.

FIG. 24 illustrates a block diagram of a computing system 2400 operable to execute communications in accordance with the disclosed architecture. In order to provide additional context for various aspects thereof, FIG. 24 and the following discussion are intended to provide a brief, general description of the suitable computing system 2400 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 2400 for implementing various aspects includes the computer 2402 having processing unit(s) 2404, a system memory 2406, and a system bus 2408. The processing unit(s) 2404 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 2406 can include volatile (VOL) memory 2410 (e.g., random access memory (RAM)) and non-volatile memory (NON-VOL) 2412 (e.g., ROM, EPROM, EEPROM, etc.). A basic input/output system (BIOS) can be stored in the non-volatile memory 2412, and includes the basic routines that facilitate the communication of data and signals between components within the computer 2402, such as during startup. The volatile memory 2410 can also include a high-speed RAM such as static RAM for caching data.

The system bus 2408 provides an interface for system components including, but not limited to, the memory subsystem 2406 to the processing unit(s) 2404. The system bus 2408 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 2402 further includes storage subsystem(s) 2414 and storage interface(s) 2416 for interfacing the storage subsystem(s) 2414 to the system bus 2408 and other desired computer components. The storage subsystem(s) 2414 can include one or more of a hard disk drive (HDD), a magnetic floppy disk drive (FDD), and/or optical disk storage drive (e.g., a CD-ROM drive DVD drive), for example. The storage interface(s) 2416 can include interface technologies such as EIDE, ATA, SATA, and IEEE 2494, for example.

One or more programs and data can be stored in the memory subsystem 2406, a removable memory subsystem 2418 (e.g., flash drive form factor technology), and/or the storage subsystem(s) 2414, including an operating system 2420, one or more application programs 2422, other program modules 2424, and program data 2426. Generally, programs include routines, methods, data structures, other software components, etc., that perform particular tasks or implement particular abstract data types. All or portions of the operating system 2420, applications 2422, modules 2424, and/or data 2426 can also be cached in memory such as the volatile memory 2410, for example. It is to be appreciated that the disclosed architecture can be implemented with various commercially available operating systems or combinations of operating systems (e.g., as virtual machines).

The aforementioned application programs 2422, program modules 2424, and program data 2426 can include the computer-implemented communications system 100, the meeting component 102, the communications application 104, the multiple meetings 106, the conversation component 108, and the multiple conversation threads 110 of FIG. 1, the aspects 200, the meeting schedule component 202, the list 204 of scheduled meetings, the ad hoc collaboration component 206, the ad hoc meeting 208, and the search component 210 of FIG. 2, the content management component 300, the pre-meeting content 302, and the post-meeting content 304 of FIG. 3, the conversation threads 400, the active conversation threads 402, the past conversation threads 404, and the persistent conversation threads 406 of FIG. 4.

The aforementioned application programs 2422, program modules 2424, and program data 2426 can also include the computer-implemented system 500, the navigation menu component 502, the multiple communications components 504, the communications items 506, the conversation component 508, the meeting component 510, the selection pane component 512, the preview pane component 514, the specific communications item 516, and the notification component 518, of FIG. 5, the list of active communications items 600, the list of history communications items 602, and the list of persistent communications items 604 of FIG. 6.

The aforementioned application programs 2422, program modules 2424, and program data 2426 can further include the user interface 1100, the identification display 1102, the phone selector 1104, the people & groups selector 1106, the meetings selector 1108, the conversations selector 1110, the calendar information 1112, the meeting information field 1114, the join meeting button 1116, the new meeting button 1118, and the conference now button 1120 of FIG. 11, the user interface 1200, the identification display 1202, the phone environment selector 1204, the people & groups environment selector 1206, the meetings environment selector 1208, the conversations environment selector 1210, the selection pane 1212, the active conversations list 1214, the conversation history list 1216, and the preview pane 1218 of FIG. 12, and the methods of FIGS. 7-10, for example.

The aforementioned application programs 2422, program modules 2424, and program data 2426 can include the computer-implemented communications system 100, the recovery component 1302 and recovery information 1304 of FIG. 13, the store component 1402, session identifier 1404, the session information 1406, the content information 1408, and other information 1410 of FIG. 14, the permissions component 1502, the recovery permissions 1504, and database programs to manage the client datastore 1506 and server datastore 1508 of FIG. 15, and the monitor component 1610 of FIGS. 16, 17.

The aforementioned application programs 2422, program modules 2424, and program data 2426 can also include the computer-implemented system 1800, the navigation menu component 1802, the multiple communications components 1804, the recovered communications items 1806, the conversation component 1808, the meeting component 1810, the selection pane component 1812, the preview pane component 1814, the specific recovered communications item 1816, and the notification component 1818, of FIG. 18, the list of active recovered communications items 1900, the list of history recovered communications items 1902, and the list of recovered persistent communications items 1904 of FIG. 19, and the methods of FIGS. 20-23, for example.

The storage subsystem(s) 2414 and memory subsystems (2406 and 2418) serve as computer readable media for volatile and non-volatile storage of data, data structures, computer-executable instructions, and so forth. Computer readable media can be any available media that can be accessed by the computer 2402 and includes volatile and non-volatile media, removable and non-removable media. For the computer 2402, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 2402, programs, and data using external user input devices 2428 such as a keyboard and a mouse. Other external user input devices 2428 can include a microphone, an IR (infrared) remote control, a joystick, a game pad, camera recognition systems, a stylus pen, touch screen, gesture systems (e.g., eye movement, head movement, etc.), and/or the like. The user can interact with the computer 2402, programs, and data using onboard user input devices 2430 such a touchpad, microphone, keyboard, etc., where the computer 2402 is a portable computer, for example. These and other input devices are connected to the processing unit(s) 2404 through input/output (I/O) device interface(s) 2432 via the system bus 2408, but can be connected by other interfaces such as a parallel port, IEEE 2494 serial port, a game port, a USB port, an IR interface, etc. The I/O device interface(s) 2432 also facilitate the use of output peripherals 2434 such as printers, audio devices, camera devices, and so on, such as a sound card and/or onboard audio processing capability.

One or more graphics interface(s) 2436 (also commonly referred to as a graphics processing unit (GPU)) provide graphics and video signals between the computer 2402 and external display(s) 2438 (e.g., LCD, plasma) and/or onboard displays 2440 (e.g., for portable computer). The graphics interface(s) 2436 can also be manufactured as part of the computer system board.

The computer 2402 can operate in a networked environment (e.g., IP) using logical connections via a wire/wireless communications subsystem 2442 to one or more networks and/or other computers. The other computers can include workstations, servers, routers, personal computers, microprocessor-based entertainment appliance, a peer device or other common network node, and typically include many or all of the elements described relative to the computer 2402. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 2402 connects to the network via a wire/wireless communication subsystem 2442 (e.g., a network interface adapter, onboard transceiver subsystem, etc.) to communicate with wire/wireless networks, wire/wireless printers, wire/wireless input devices 2444, and so on. The computer 2402 can include a modem or has other means for establishing communications over the network. In a networked environment, programs and data relative to the computer 2402 can be stored in the remote memory/storage device, as is associated with a distributed system. It will be appreciated that the network connections shown are exemplary and other means of establishing a communications link between the computers can be used.

The computer 2402 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 25:
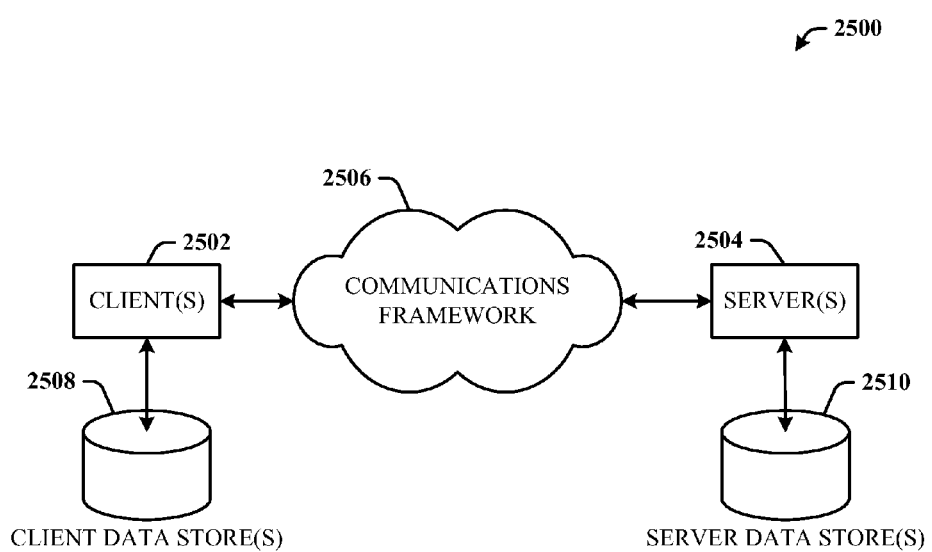
FIG. 25 illustrates an exemplary computing environment operable to provide communications.

FIG. 25 illustrates a schematic block diagram of a computing environment 2500 that can be used for communications. The environment 2500 includes one or more client(s) 2502. The client(s) 2502 can be hardware and/or software (e.g., threads, processes, computing devices). The client(s) 2502 can house cookie(s) and/or associated contextual information, for example.

The environment 2500 also includes one or more server(s) 2504. The server(s) 2504 can also be hardware and/or software (e.g., threads, processes, computing devices). The servers 2504 can house threads to perform transformations by employing the architecture, for example. One possible communication between a client 2502 and a server 2504 can be in the form of a data packet adapted to be transmitted between two or more computer processes. The data packet may include a cookie and/or associated contextual information, for example. The environment 2500 includes a communication framework 2506 (e.g., a global communication network such as the Internet) that can be employed to facilitate communications between the client(s) 2502 and the server(s) 2504.

Communications can be facilitated via a wire (including optical fiber) and/or wireless technology. The client(s) 2502 are operatively connected to one or more client data store(s) 2508 that can be employed to store information local to the client(s) 2502 (e.g., cookie(s) and/or associated contextual information). Similarly, the server(s) 2504 are operatively connected to one or more server data store(s) 2510 that can be employed to store information local to the servers 2504.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
   a processing unit;
   a meeting component of a communications application executing on the processing unit for selecting a meeting from multiple meetings during one or more communications sessions;
   a conversation component of the communications application for managing multiple conversation threads during the one or more communications sessions;
   a monitor component for detecting a recovery event, the recovery event comprising an event that causes failure of an application program associated with at least one of the multiple conversation threads during the one or more communications sessions; and
   a recovery component of the communications application for recovering the meeting from the multiple meetings in response to the recovery event, wherein each conversation thread in the multiple conversation threads of the meeting includes a history communications item or a persistent communications item, the recovery component further operative to establish a new active communications session by converting the history communications item or the persistent communications item or a combination of the history communications item and the persistent communications item into a new communications session.

2. The system of claim 1, further comprising a store component for storing recovery information related to at least one of the multiple meetings or multiple conversation threads using a unique identifier.

3. The system of claim 1, further comprising a store component for storing recovery information including session information and content information.

4. The system of claim 1, further comprising a permissions component for storing recovery permissions associated with the recovery component.

5. The system of claim 1, further comprising a store component for storing recovery information on a client datastore or a server datastore based on a set of recovery permissions.

6. The system of claim 1, wherein the monitor component monitors active meetings and active conversation threads to detect the recovery event.

7. The system of claim 1, wherein the multiple conversation threads are associated with at least one of instant messaging, group chat, or an online meeting.

8. A computer-implemented communications system, comprising:
- a processing unit;
- a navigation menu component executing on the processing unit for selecting between communications components that include one or more communications items, the communications components include,
  - a conversations component of a real-time communications application to initiate the one or more communications items during one or more communications sessions in which the one or more communications items comprise at least one conversation thread in a conversation format;
  - a meeting component of the real-time communications application to initiate the one or more communications items during the one or more communications sessions in which the one or more communications items comprise at least one meeting corresponding to a conferencing application;
  - a store component of the real-time communications application to store recovery information comprising control and signaling information for establishing, managing and terminating the one or more communications sessions;
  - a recovery component of the real-time communications application to use the recovery information to recover the conferencing application in response to a recovery event, the recovery event comprising an event that causes termination of the one or more communication sessions, wherein each conversation thread includes a history communications item or a persistent communications item, and wherein the recovery component is further operative to establish a new active communications session by converting the history communications item, the persistent communications item, or a combination of the history communications item and the persistent communications item into a new communications session;
  - a selection pane component for displaying a list of the recovered communications items; and
  - a preview pane component for displaying a preview of a specific recovered communications item from the list.

9. The system of claim 8, wherein the conversation format is associated with instant messaging, group chat, a telephone call, voice, video, email, application sharing, or an online meeting.

10. The system of claim 8, wherein the selection pane component includes a list of recovered active communications items.

11. The system of claim 8, further comprising a notification component for indicating a recovered active communications item has been restored.

12. A computer-implemented method of communications, comprising:
- exposing functionality, via a processing unit, for a conversations environment and a meetings environment in a communications application;
- displaying a list of items associated with the conversations environment or the meetings environment;
- initiating a first communications session for a specific item from the list of items, the communications session including a conversation thread, the conversation thread including a history communications item or a persistent communications item;
- detecting a recovery event, the recovery event comprising an event that causes termination of the first communications session;
- recovering the communications application and the first communications session in response to the recovery event; and
- establishing a new active communications session by converting the history communications item, the persistent communications item, or a combination of the history communications item and the persistent communications item into a new communications session.

13. The method of claim 12, further comprising initiating the first communications session for a specific item comprising an active meeting or an active conversation thread.

14. The method of claim 12, further comprising detecting a recovery event comprising a disconnect event for the first communication session for the specific item.

15. The method of claim 12, further comprising receiving a user control directive to recover the first communication session.

16. The method of claim 12, further comprising retrieving recovery information associated with the specific item from a local datastore in response to the recovery event.

17. The method of claim 12, further comprising retrieving recovery information associated with the specific item from a remote datastore in response to the recovery event.

18. The method of claim 12, further comprising initiating a second communications session having one or more communications parameters of the first communication session using recovery information associated with the specific item.

19. The method of claim 12, further comprising initiating a second communications session having one or more content items of the first communication session using recovery information associated with the specific item.

20. The method of claim 12, further comprising presenting a notification indicating the specific item has been restored.

* * * * *